United States Patent
Salah et al.

(10) Patent No.: US 12,040,835 B2
(45) Date of Patent: Jul. 16, 2024

(54) OPTICAL NETWORK WITH OPTICAL CORE AND NODE USING TIME-SLOTTED RECEPTION

(71) Applicant: Nippon Telegraph and Telephone Corporation, Tokyo (JP)

(72) Inventors: Ibrahim Salah, Musashino (JP); Toshikazu Hashimoto, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 42 days.

(21) Appl. No.: 17/800,735

(22) PCT Filed: Feb. 28, 2020

(86) PCT No.: PCT/JP2020/008366
§ 371 (c)(1),
(2) Date: Aug. 18, 2022

(87) PCT Pub. No.: WO2021/171569
PCT Pub. Date: Sep. 2, 2021

(65) Prior Publication Data
US 2023/0104943 A1   Apr. 6, 2023

(51) Int. Cl.
*H04B 10/27* (2013.01)
*H04L 12/28* (2006.01)
*H04L 47/70* (2022.01)

(52) U.S. Cl.
CPC ............ *H04B 10/27* (2013.01); *H04L 12/28* (2013.01); *H04L 47/70* (2013.01)

(58) Field of Classification Search
CPC ................ H04B 10/27; H04L 12/28
(Continued)

(56) References Cited

U.S. PATENT DOCUMENTS 9,698,930 B2* 7/2017 Wang .................... H04J 14/022
9,854,337 B1* 12/2017 Ye ...................... H04Q 11/0005
(Continued)

OTHER PUBLICATIONS

Miao et al.; Novel flat datacenter network architecture based on scalable and flow-controlled optical switch system ; Feb. 2014; Optics Express; pp. 1-4. (Year: 2014).*
(Continued)

*Primary Examiner* — Amritbir K Sandhu
(74) *Attorney, Agent, or Firm* — Workman Nydegger

(57) ABSTRACT

There has been a problem with nodes that are present on the periphery of a flat optical network in that an enormous number of receivers are needed, which have reached the limit of the capacity of the ASIC switch. An optical network of the present disclosure proposes introduction of a slight time-domain limit to data transmission from network nodes to the same destination node. The network operates in accordance with a time slot system for data transmission/reception. The ASIC switch has a switching capacity corresponding to an average volume of incoming traffic at a plurality of nodes, and is provided with a storage medium that stores therein and handle a volume of traffic exceeding this switching capacity. A decreased transmission bandwidth between nodes due to the time-domain limit can also be improved by using a plurality of time slots, and transmitting an optical signal according to optical circuit switching by using an unassigned time slot.

7 Claims, 20 Drawing Sheets

(58) Field of Classification Search
USPC .......................................................... 398/66
See application file for complete search history.

(56) References Cited

U.S. PATENT DOCUMENTS

| | | | | |
|---|---|---|---|---|
| 2016/0316284 | A1* | 10/2016 | Javidi | ................ H04Q 11/0005 |
| 2018/0234473 | A1* | 8/2018 | Levi | ........................ H04L 49/90 |
| 2021/0176543 | A1* | 6/2021 | Bakopoulos | ....... H04Q 11/0005 |
| 2023/0104943 | A1* | 4/2023 | Salah | ...................... H04L 12/28 |
| | | | | 398/66 |

OTHER PUBLICATIONS

Benjamin et al.; PULSE: Optical Circuit Switched Data Center Architecture Operating at Nanosecond Timescales; May 2020; IEEE; pp. 1-16. (Year: 2020).*

Miao et al.; Novel flat datacenter network architecture based on scalable and flow-controlled optical switch system; Feb. 2014; IEEE; pp. 1-16. (Year: 2014).*

*White Rabbit*, White Rabbit Project Webpage, Feb. 20, 2020 (Reading Day), https://www.ohwr.org/project/white-rabbit/wikis/home, pp. 1-2.

Kari Clark et al., *Sub-Nanosecond Clock and Data Recovery in an Optically-Switched Data Centre Network*, ECOC 2018, Sep. 23, 2018, pp. 1-3.

* cited by examiner

Fig. 8(a) FROM G1
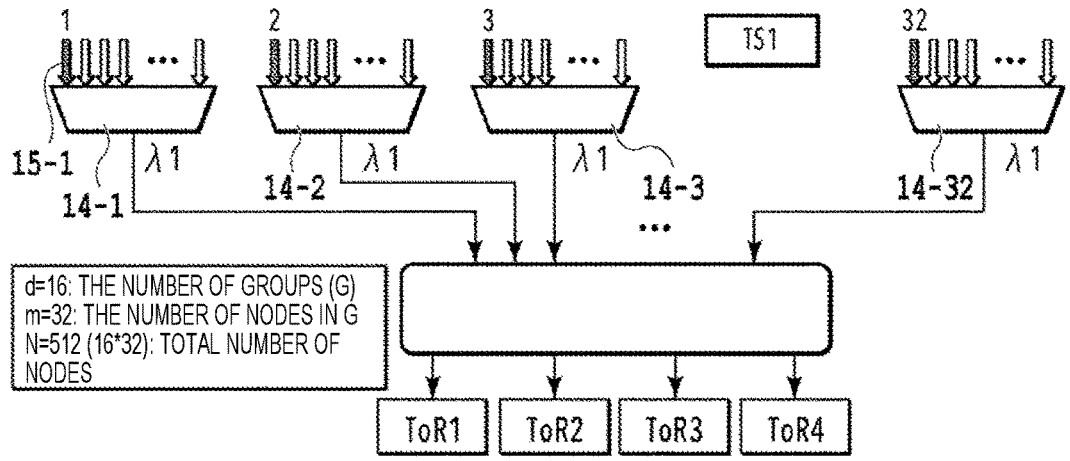
Fig. 8(b) FROM G2
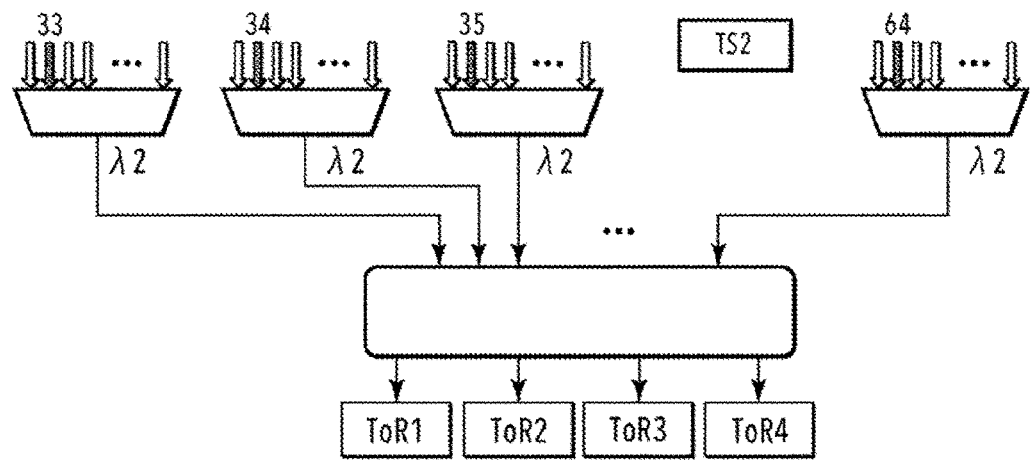
Fig. 8(c) FROM G16
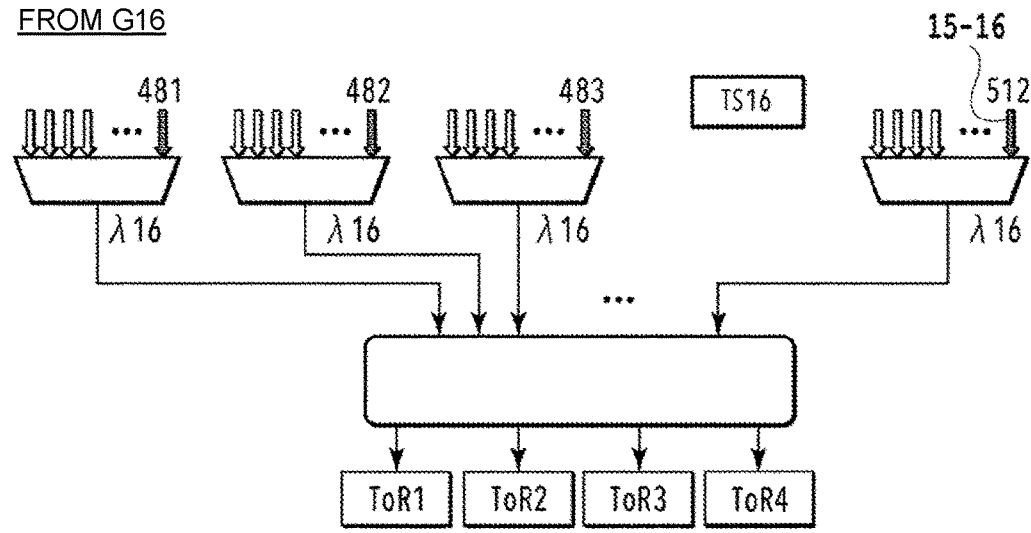

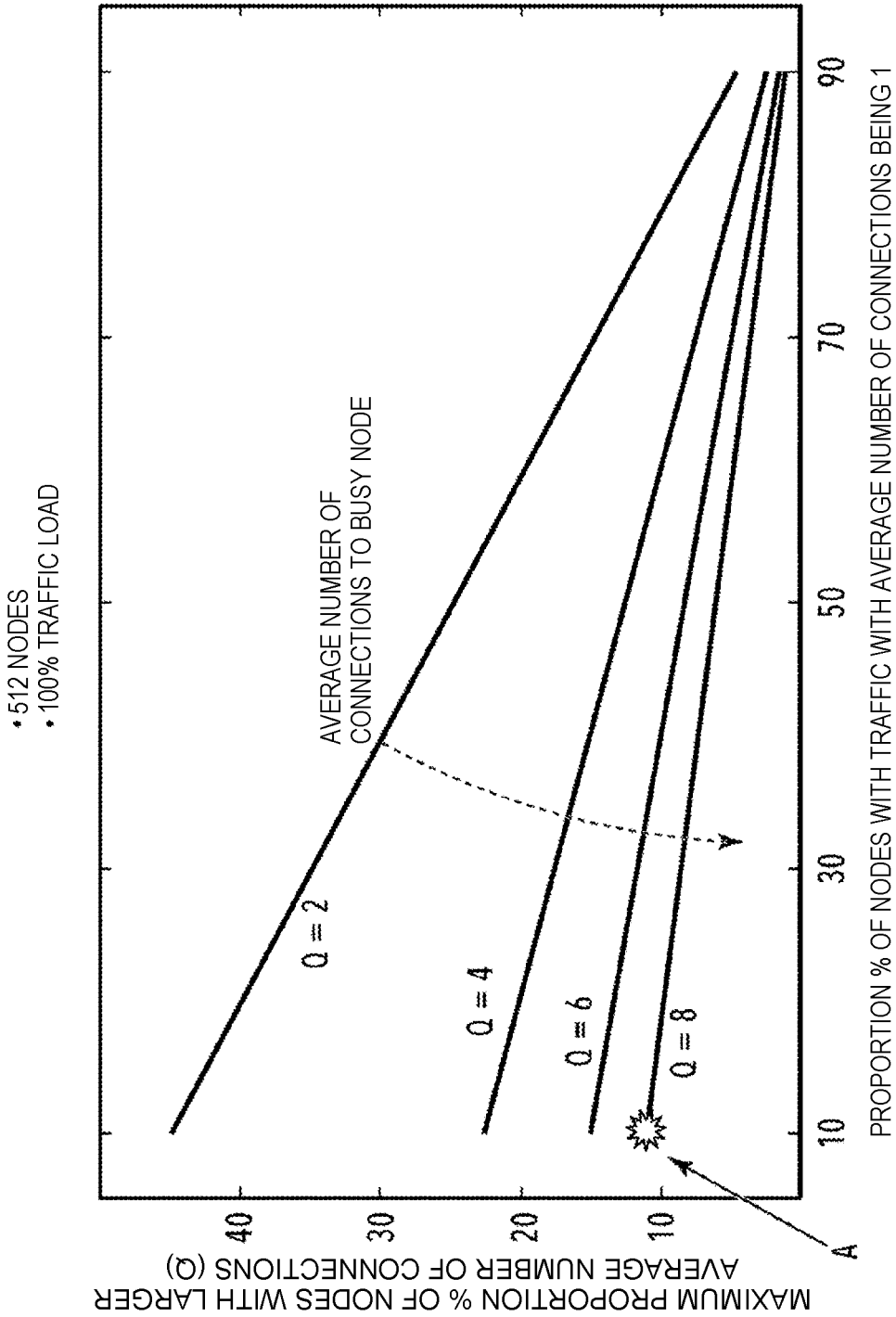

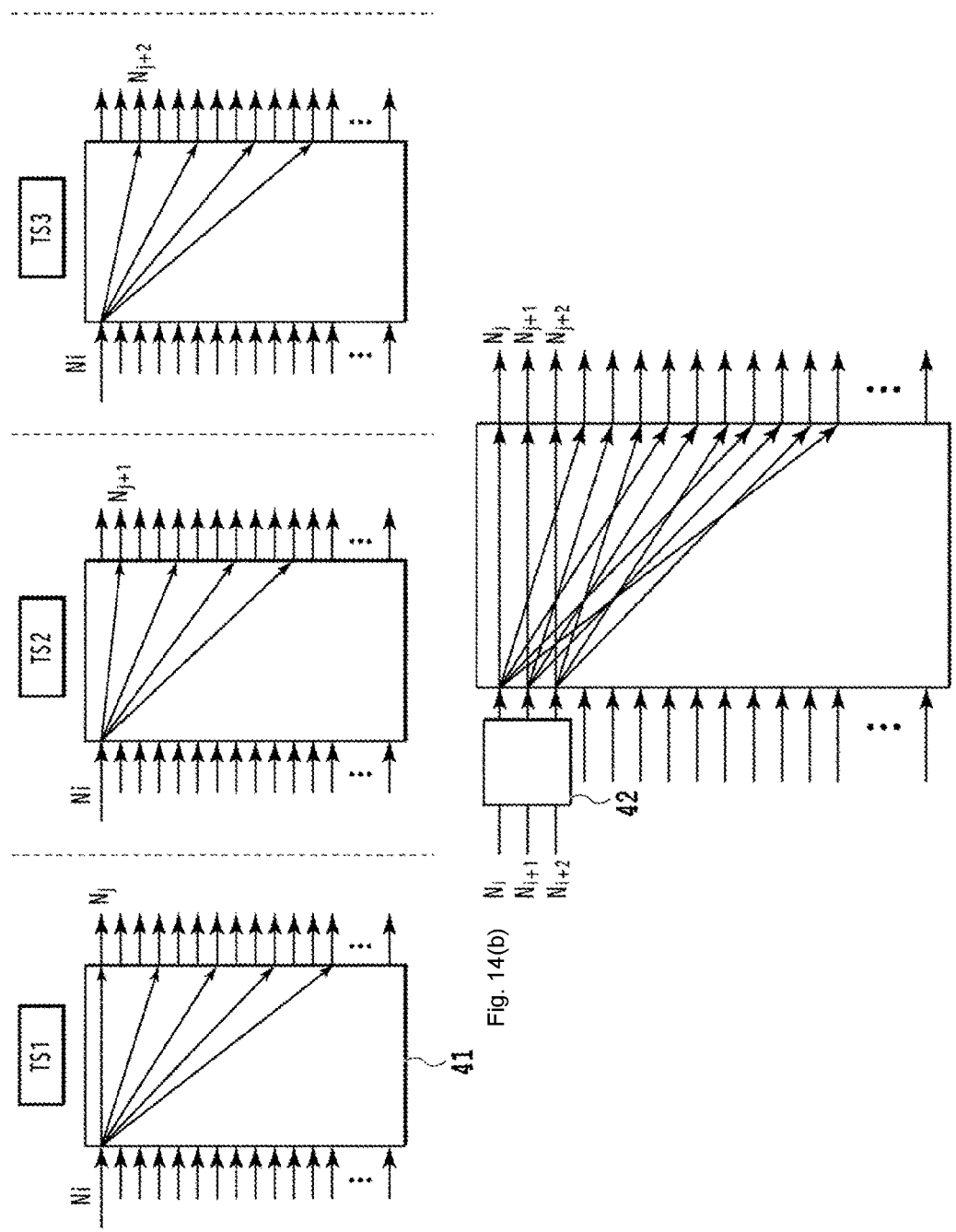

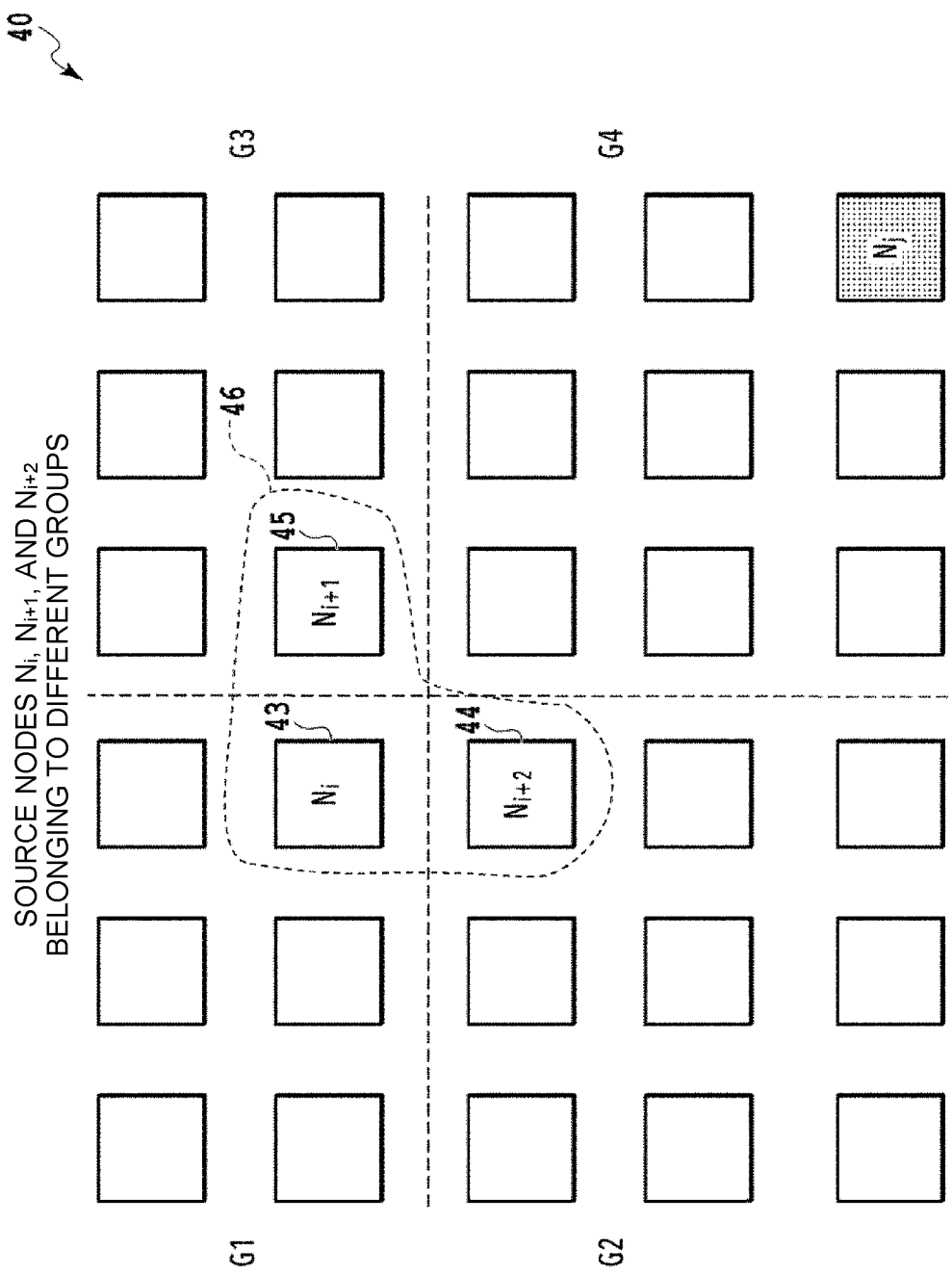

Fig. 20

| RATIO OF NUMBER OF NODES (AVERAGE NUMBER OF CONNECTIONS 8, 4, 2) | ONE-TO-ONE NODE TRAFFIC 80% | ONE-TO-ONE NODE TRAFFIC 40% | ONE-TO-ONE NODE TRAFFIC 20% | ONE-TO-ONE NODE TRAFFIC 10% |
|---|---|---|---|---|
| 1:2:4 | A1 | A2 | A3 | A4 |
| 1:1:1 | B1 | B2 | B3 | B4 |
| 4:2:1 | C1 | C2 | C3 | C4 |

OPTICAL NETWORK WITH OPTICAL CORE AND NODE USING TIME-SLOTTED RECEPTION

TECHNICAL FIELD

The present invention relates to an optical network, an optical node used in the optical network, and an optical transmission method.

BACKGROUND ART

Facilities specialized for installing and operating computers (such as main frame computers, mini-computers, and servers), data communication devices, and other devices are collectively referred to as "data center." The data center (DC) network has grown rapidly to provide a wide range of services, while keeping up with a significant increase in the volume of traffic. However, the basic structure of the network has not changed quickly enough to keep up with this situation.

FIG. 1 illustrates the configuration of a DC network of the conventional technique. A typical DC network is made up of a plurality of layers. For example, the typical DC network is of a three-layer DC network configuration as illustrated in FIG. 1. A three-layer DC network 100 includes switches 101, optical links 102, switches 103, optical links 104, top-of-rack (ToR) switches 105, and servers 106 in order from the upper-level layer. Each of the switches 101 is made up of upper and lower electrical switches, and optical links 107 connecting the upper and lower electrical switches to each other. Each of the switches 103 is made up of upper and lower electrical switches, and optical links 108 connecting the upper and lower electrical switches to each other. Therefore, the DC network in FIG. 1 has eight hops between two ToRs. Optical-electrical-optical (OEO) conversion is performed over the wide area covered by each electrical switch.

In the DC network 100 as described above, data is transmitted as an optical signal through a link connecting network nodes made up of one or more servers. In each of the network nodes, an optical signal is converted to an electrical signal, and the electrical signal is switched by an electrical switch, that is, an application specific integrated circuit (ASIC) switch. The switching capacity of the ASIC switch continues to be increased significantly. It has been reported that some of the current ASIC switches have the capacity of 12.8 Tb/s.

Non-Patent Literature 1: White Rabbit project webpage, the Internet <URL:https://www.ohwr.org/project/white-rabbit/wikis/home>

Non-Patent Literature 2: K. Clark et al., "Sub-Nanosecond Clock and Data Recovery in an Optically-Switched Data Centre Network," in 2018, post-deadline paper in ECOC 2018, Italy

SUMMARY OF THE INVENTION

Technical Problem

However, it is conceivable that the increase in the switching capacity of the ASIC switch may reach its limit eventually. The reason for this is that it is increasingly difficult to further downsize the complementary metal oxide semiconductor (CMOS) transistor that is a unit constituent of the ASIC switch. There has been a demand for the post-planar-CMOS production process to further downsize the CMOS transistor. However, this production process is technically difficult and very costly, and is therefore difficult to be economically feasible.

There is a more urgent problem that a very high data rate is required for optical signals to be input/output to the ASIC switch. A pluggable transceiver has been conventionally used to accommodate the high data rate. However, the pluggable transceiver faces the difficult obstacle of having a limited data density. Co-packaging of a transceiver and an ASIC switch is receiving attention in recent years, and is considered as a new technique that can replace the pluggable transceiver. Even though such an advanced approach is employed, a problem of power consumption still remains.

A fundamental solution to all the above problems is to avoid, or at least reduce, OEO conversion which is conventionally unavoidable for ASIC switches. It is thus necessary to introduce optical switching into the DC network structure.

The present invention has been made in view of the above problems, and it is an object of the present invention to propose a new DC network structure that overcomes various limits of an ASIC switch.

Means for Solving the Problem

To attain this object, one aspect is directed to an optical network including: an optical core portion having a full mesh network configuration; and a plurality of nodes connected to the optical core portion, the plurality of nodes being divided into a plurality of groups, each of the groups including at most "m" nodes, wherein only during a time slot associated with a group to which a source node belongs, each of the plurality of nodes can be addressed by any node in the group to which the source node belongs.

In the optical network according to another aspect, each of the plurality of nodes may include "m" arrayed waveguide gratings (AWGs) in which a plurality of input ports of the AWGs receive corresponding optical signals from the at most "m" nodes belonging to a same group, and a wavelength to be used by one or more source nodes of the at most "m" nodes is set to be compatible with an operating wavelength of the plurality of input ports, "m" receivers connected to output multiplexing ports of the AWGs, and an ASIC switch that switches an electrical signal from the "m" receivers, and routes the electrical signal to a plurality of servers.

The optical network described above also has an aspect of the invention as a network node in the optical network.

Effects of the Invention

The optical network of the present disclosure simplifies the node configuration, and reduces the capacity and power consumption of the ASIC switch. The optical network of the present disclosure also copes with an increase in the scale of the optical network and a decrease in power consumption in the optical network.

BRIEF DESCRIPTION OF DRAWINGS

FIG. 8 illustrate examples of data receiving operation of a network of a different group configuration.

FIG. 11 is an explanatory diagram illustrating an obtainable combination of a plurality of nodes with different average numbers of connections.

FIG. 14 are explanatory diagrams illustrating the method for receiving data during a time slot other than an allotted time slot.

FIG. 15 is an explanatory diagram illustrating an additional switch for source nodes to compensate for a decrease in effective BW.

FIG. 20 is a table illustrating the numbers of connections in each node distribution, and the conditions for the combination in FIG. 19.

DESCRIPTION OF EMBODIMENTS

The disclosure below proposes a new DC network structure that achieves end-to-end optical transmission between desired paired nodes, and that uses optical switching in a core portion of the DC network, while using electrical switching only on the periphery of the DC network.

Configuration of Core Portion of Optical Network

Figure 2:
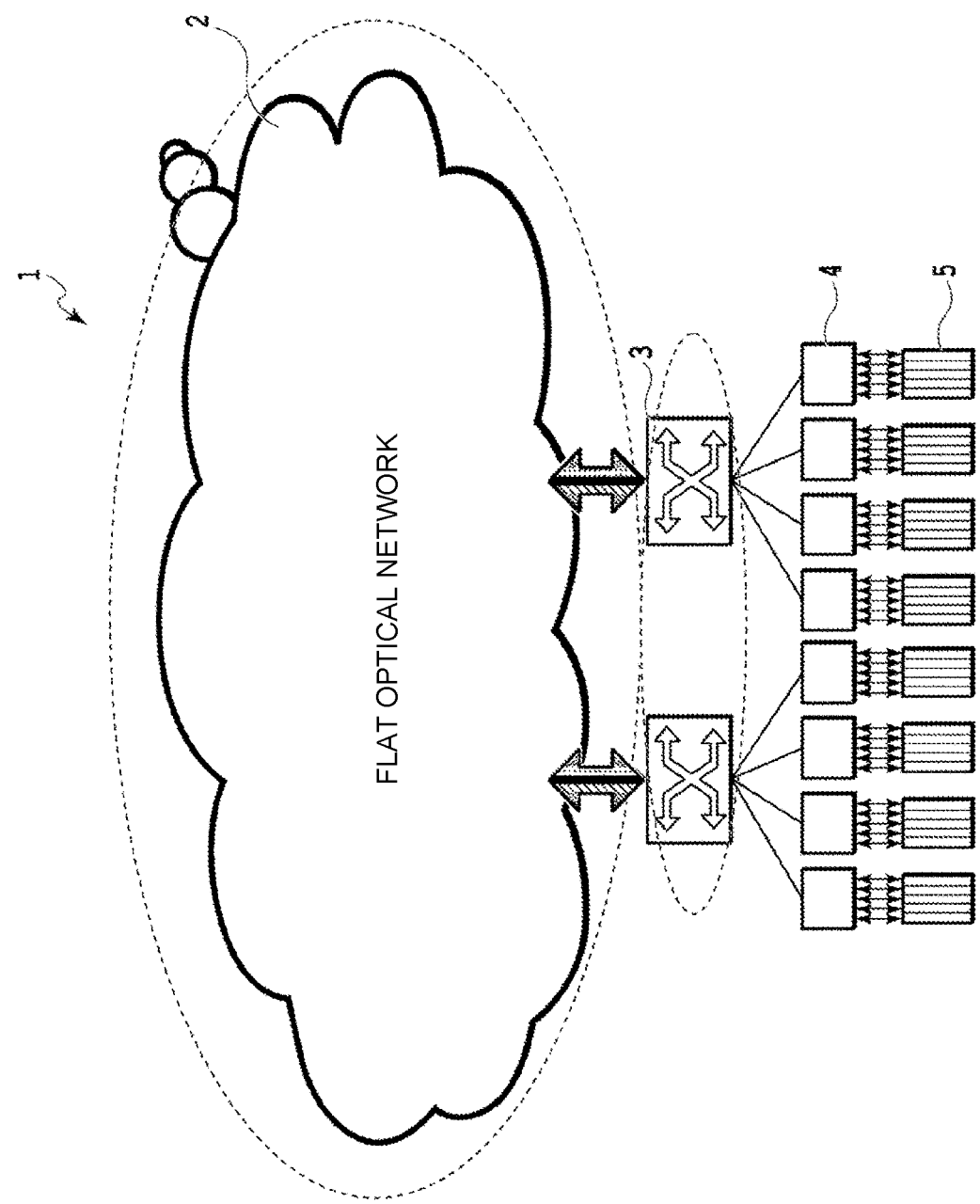
FIG. 2 illustrates the configuration of a novel DC network according to the present disclosure.

FIG. 2 illustrates the configuration of a novel DC network according to the present disclosure. A DC network 1 includes a flat optical network 2, SW units 3, ToRs 4, and servers 5. The flat optical network 2 is a core part of the network in its entirety. The SW units 3, the ToRs 4, and the servers 5 are present on the periphery of the network in its entirety. Details of these elements will be described later. The elements on the periphery of the network make up some of the nodes. In FIG. 2, a single node is defined as including four ToRs, and two nodes are illustrated for the sake of simplicity. It should be understood that in addition to the two nodes, there are many nodes present around the flat optical network 2. A network is presented in which, as already described, optical switching is used in the flat optical network 2 that is a core part, while electrical switching is used only in the SW units 3 that are a peripheral part of the flat optical network 2, and on the periphery of the SW units 3. The optical network structure in FIG. 2 is scalable, and supports highly dynamic connection between any paired nodes. Depending on the number of nodes included in the network, the core part of the network can be implemented as a physical full mesh network, or as a physical full mesh-like network.

Figure 1:
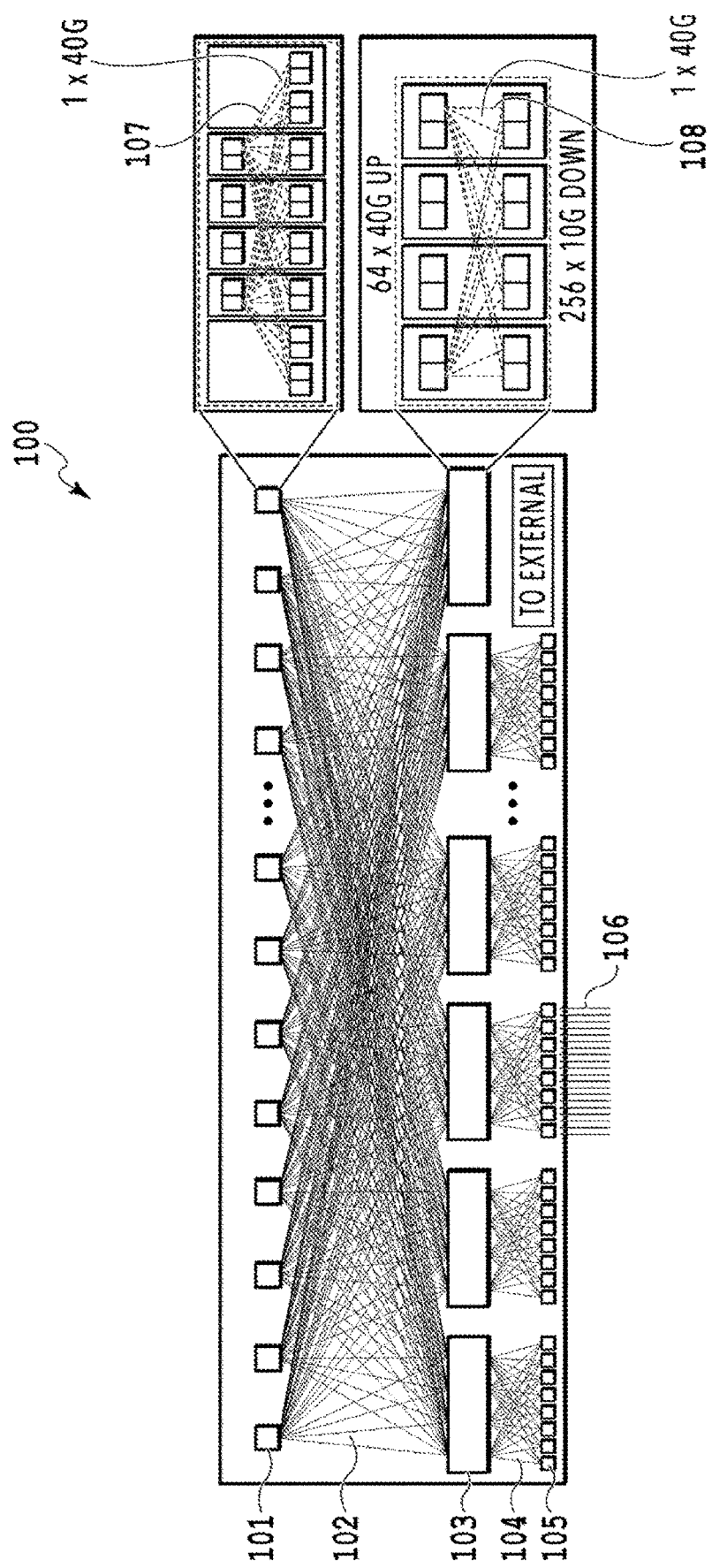
FIG. 1 illustrates the configuration of a DC network of the conventional technique.

A full mesh network or a full mesh-like network, which is the base of the DC network of the present disclosure illustrated in FIG. 2, is different from the DC network 100 of the conventional technique in FIG. 1 in that the core portion only uses optical switching. The flat optical network in FIG. 2 only uses optical switching, instead of OEO conversion performed by the SWs 101 and 103 at the respective layers in FIG. 1.

The disclosure below clarifies a novel and practical data reception mechanism and its related hardware in each node. These data reception mechanism and related hardware replace some of the numerous optical receiver units and a portion of the complex high-capacity switching configuration, which have been conventionally necessary. The basic approach to the configuration of the optical network of the present disclosure is to introduce a slight time-domain limit to transmission from network nodes to the same destination node. Specifically, the point of the approach is that the network operates in accordance with a time slot system. In addition, a reduction in the switching capacity of an ASIC switch, and a reduction in its power consumption are disclosed. Initially, the node configuration and the access method in the DC network that is the base of the optical network of the present disclosure are reviewed.

Figure 3:
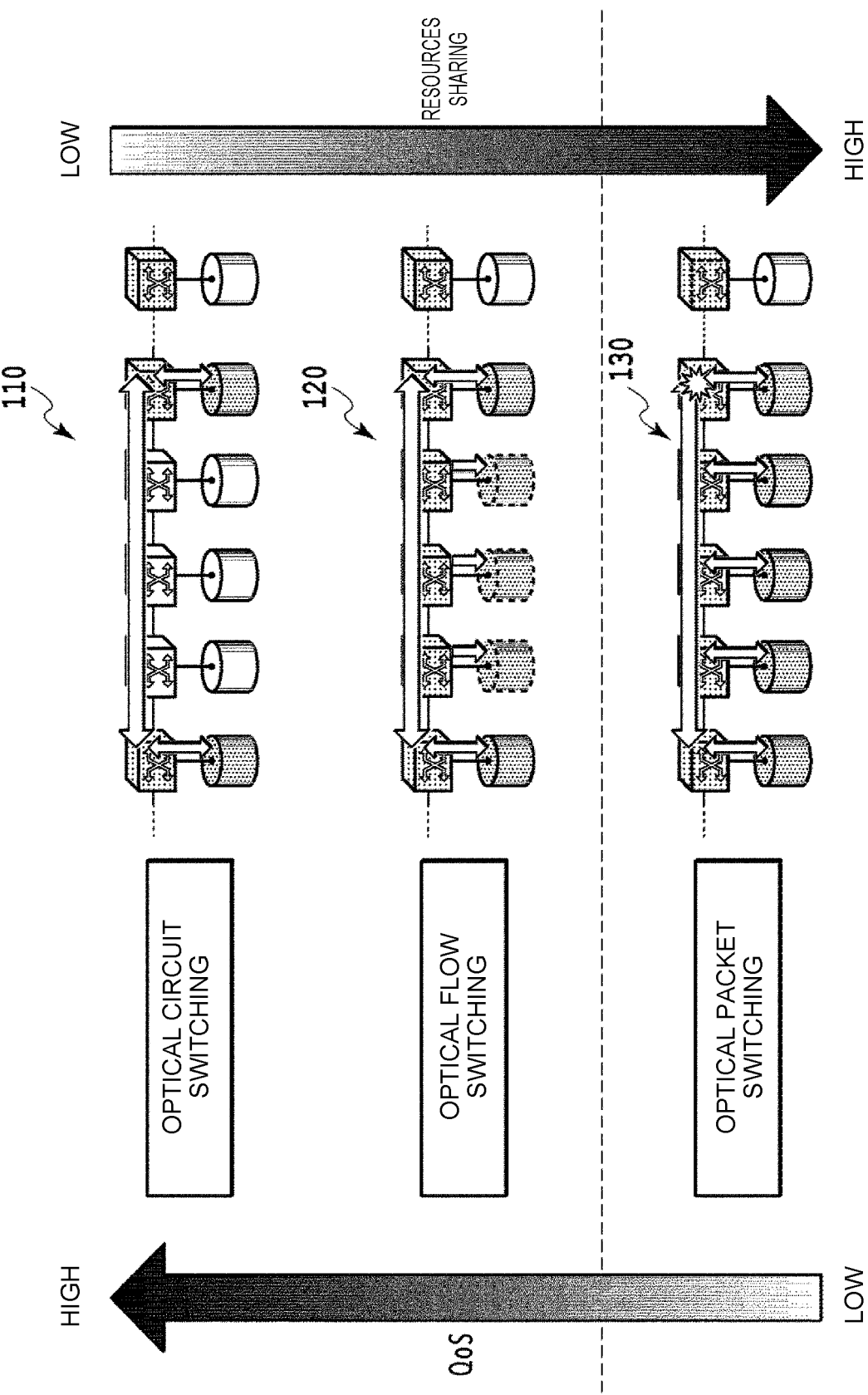
FIG. 3 illustrate typical configurations of the DC network and a comparison of access methods.

FIG. 3 illustrate typical configurations of the DC network and a comparison of methods for access to nodes. FIG. 3(a) illustrates an optical circuit switching (OCS). FIG. 3(b) illustrates an optical flow switching (burst mode optical flow switching (BM-OFS)). FIG. 3(c) illustrates optical packet switching (OPS). An OCS network 110 in FIG. 3(a) has the highest quality of service (QoS), and is capable of long-distance transmission without any collision. However, the OCS network 110 has some drawbacks including a low level of resources sharing, the limited number of links depending on the number of wavelengths, the time-consuming establishment of a new link, and an inability to cope with a dynamic change in traffic. In contrast, an OPS network 130 in FIG. 3(c) can share the network resources at a higher level, while being not able to completely eliminate collisions.

In a cloud DC network, the number of nodes may reach several tens of thousands, while an edge DC network close to end users is made up of a much smaller number of nodes than that of the cloud DC network. In a case where an optical network of N nodes establishes physical full mesh connection in the optical core part of the network, N×(N−1) transmitters, N×(N−1) receivers, and N×(N−1) bidirectional optical links are necessary. This requires a very large amount of resources. Such a network configuration as described above can possibly be available for the edge DC network made up of, for example, a small, limited number of nodes. However, as the number of nodes is increased, cost of the nodes is increased and installation of the nodes is more complicated, which are problems with the physical full mesh connection.

As described above, the OCS network 110 in FIG. 3(a) is built by full mesh connection, which requires a very large amount of resources. In view of that, the present inventors have proposed a BM-OFS network 120 in FIG. 3(*b*). Although not explained in detail, the BM-OFS network 120 is a full mesh-like network in a torus network topology that employs optical burst mode transmission on a dedicated wavelength. The BM-OFS network 120 is dependent on label-based switching, and enables a dynamic optical network which guarantees the QoS by using available wavelength resources. A highly scalable DC network is built by reusing the same wavelength in more network nodes. More specifically, in the BM-OFS network, conflict-free predefined optical paths in a torus network topology are designed, and the wavelength use is interleaved between optical fibers connected in parallel. These techniques are combined all together, so that an optical network in a full mesh topology including several thousands of nodes can be built only by utilizing, for example, some of wavelength channels available in the C band.

Problems with Reception on Periphery of Optical Network

The full mesh network or full mesh-like network as described above needs a large-scale switching configuration for each node. In a full mesh network or full mesh-like network with N nodes, any number of source nodes, at a maximum N−1 source nodes, can simultaneously perform addressing of any destination node in the network. The "addressing" not only refers to identifying a counterpart destination node as a communication destination by a source node for setting a communication link between the nodes, and designating the communication destination, but also refers to setting the communication link in practice and performing communication through the communication link.

Figure 4:
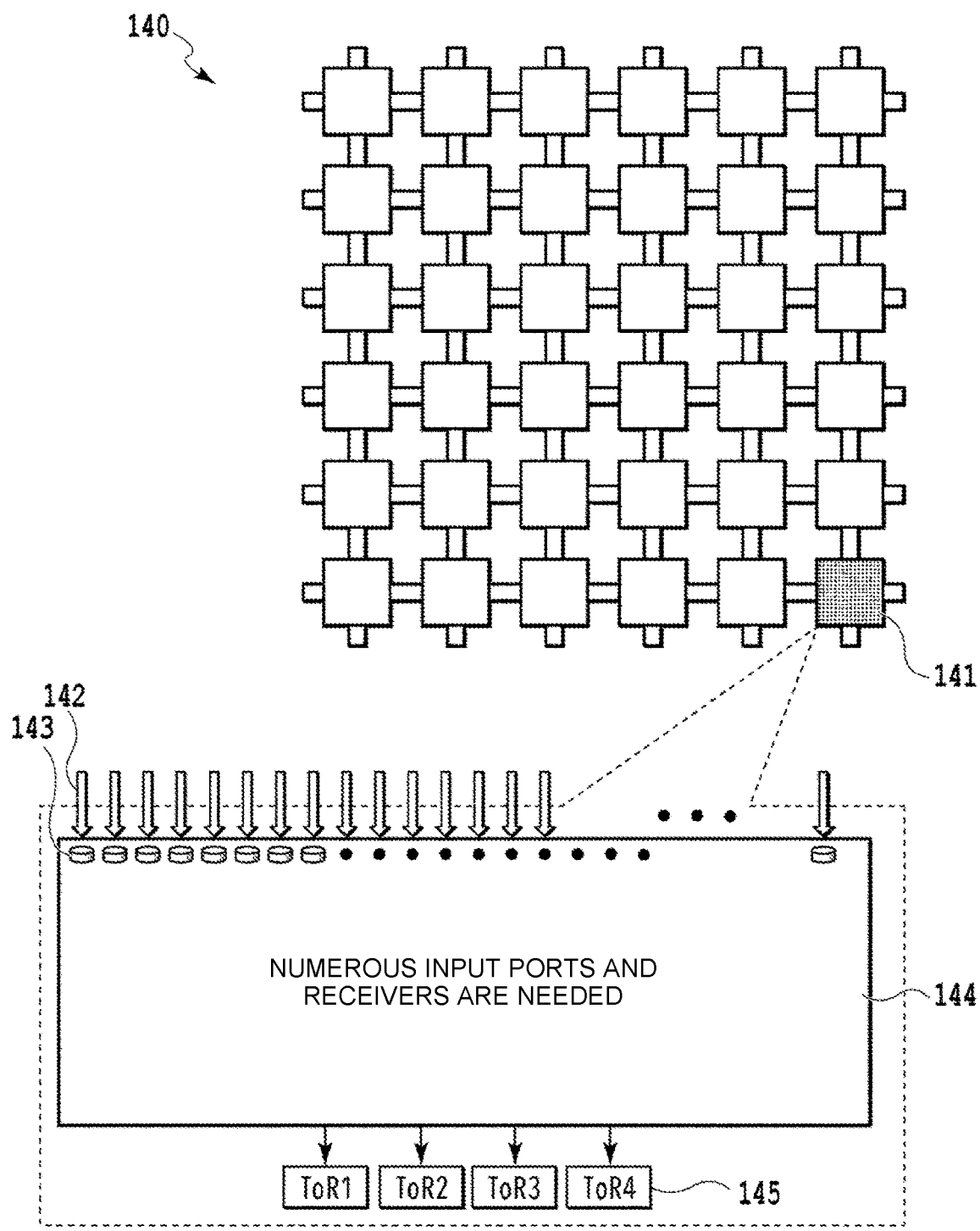
FIG. 4 is an explanatory diagram illustrating the problem with nodes on the periphery of an optical network of the conventional technique.

FIG. 4 is an explanatory diagram illustrating the problem with nodes on the periphery of an optical network of the conventional technique. FIG. 4 is a conceptual diagram of a full mesh optical network 140, and illustrates a set of nodes in the flat optical network 1 illustrated in FIG. 2. In the optical network 140, numerous nodes are connected to each other. In FIG. 4, although the nodes are drawn as if a single node is connected to each of the four adjacent nodes, a single node is illustrated symbolically as being connected to all the nodes in the optical network.

Now, focus is on a single reception node 141. The reception node 141 includes an interface unit 144 that interfaces with the optical network side. Further, the reception node 141 is connected to ToRs 145. The interface unit 144 includes receivers 143 that receive a plurality of optical signals 142 incoming at the same time. Assuming that the optical network 140 is made up of N nodes, the reception node 141 needs (N−1) receivers 143 corresponding to a large number of ports to handle all the data communication incoming at the same time. The interface unit 144 further includes a reception ASIC switch of a large-scale configuration (not illustrated). As described initially, a very high data rate is required for optical signals to be input/output to the ASIC switch. It can also be understood from FIG. 4 that each of the reception nodes needs numerous receivers and a large-scale ASIC switch. There are problems with nodes that are present on the periphery of the flat optical network as described above in that an enormous number of receivers are needed, and the ASIC switch has a limited capacity. To solve these problems, the optical network of the present disclosure proposes introduction of a slight time-domain limit to data transmission from network nodes to the same destination node.

Proposed Network System

A. Reduction in Number of Receivers

Figure 5:
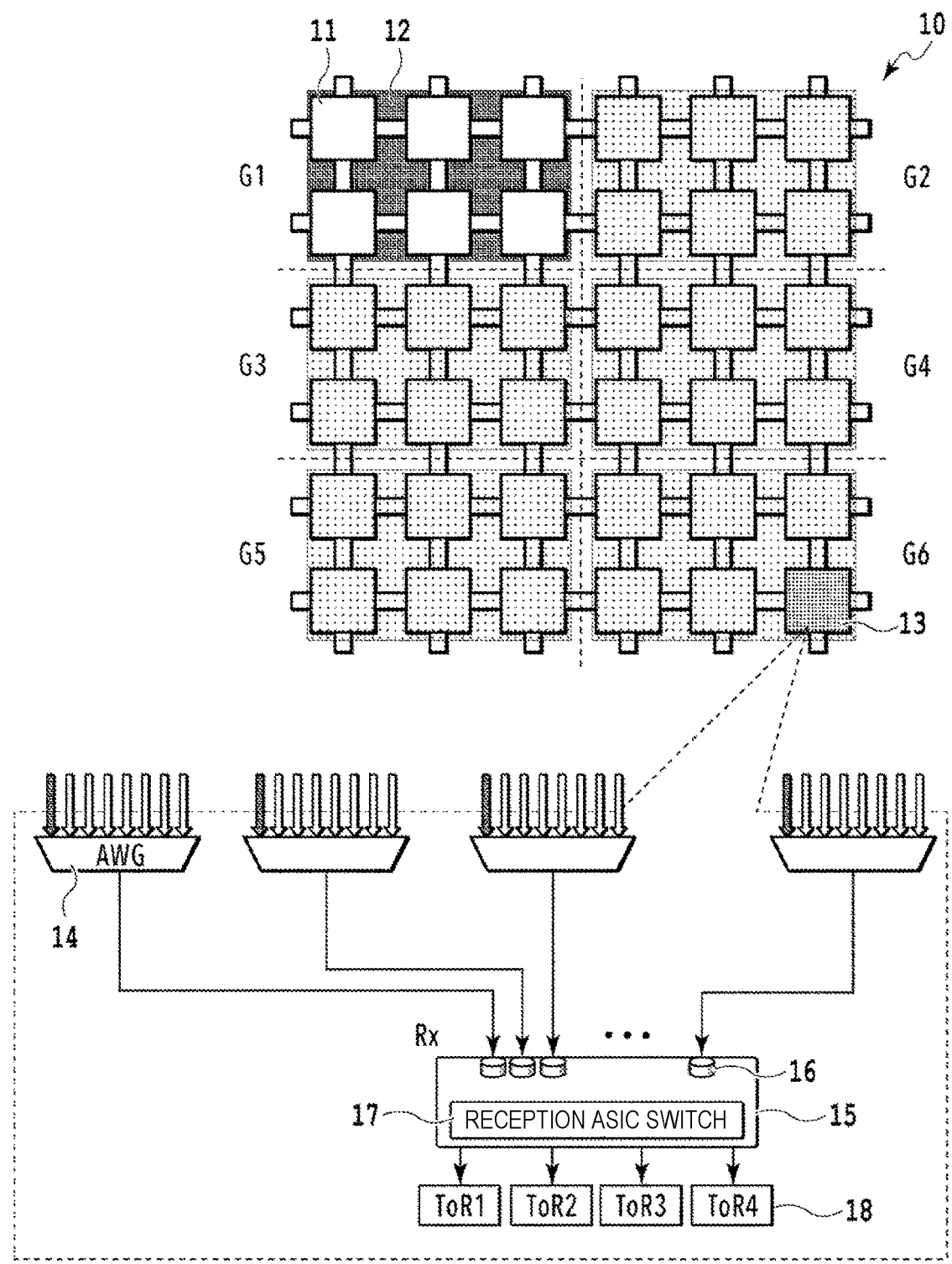
FIG. 5 is a conceptual diagram illustrating the optical network of the present disclosure and the configuration of a reception node.

FIG. 5 is a conceptual diagram illustrating the optical network of the present disclosure and the configuration of a reception node. Similarly to FIG. 4, FIG. 5 is the conceptual diagram of a full mesh or full mesh-like optical network 10. For the sake of simplicity, the optical network 10 is made up of N nodes (for example, N=36). As an example, data transmission between a transmission source node, that is, a source node 11 and a destination node, that is, a reception node 13 is considered. It is apparent in the following descriptions that a source node can also become a reception node, and a node is solely distinguished between a source node and a reception node depending on the operational function to be described. Therefore, it should be noted that a source node has the function and configuration identical to those of a reception node.

In the optical network 10, all the N network nodes that are source nodes are divided into multiple groups ("d" groups), and a group to which each of the source nodes belongs is defined. In the example in FIG. 5, six groups including the first group (G1) to the sixth group (G6) are defined, and the source node 11 belongs to a first group 12.

Any node, that is, any reception node receives data communication separately from source nodes during a time slot for a fixed duration T for each group to which the source nodes belong. That is, only during the time slot allotted to a group of source nodes, the reception node can be addressed by any of the source nodes belonging to this group. Specifically, the reception node 13 receives data from the source node 11 during a time slot allotted to the group G1 to which the source node 11 belongs. Further, the reception node 13 can be addressed by the other five source nodes belonging to the group G1 during the same time slot.

In FIG. 5, nodes belonging to a single group are illustrated as being close to each other for description purposes. However, in general, these nodes are spatially distributed from one another in the network in its entirety. These distributed nodes use a phase caching technique to allow data to arrive at a single destination node within the duration T of the allotted time slot. The phase caching technique will be described later. A reception node continuously receives data from different groups sequentially during each time slot. The cycle time in which the reception node completes to receive data from all the groups is expressed as "d" (the division number)×T (TS duration). In a case where the network is divided into groups, each of which includes an equal number of nodes, the number of nodes "m" belonging to a single group is expressed as m=N/d.

As described above, in a case where the time limit is imposed on data reception at a reception node, any reception node needs to install "m" receivers therein to handle the maximum possible traffic incoming at the same time. A maximum outgoing bandwidth (BW) of each node is represented as $B_{out}$. The term "bandwidth" used in the following descriptions refers to a transmission bandwidth with which a node can receive or transmit data, and may also be understood as transmission speed (transmission rate). It should be noted that the term "bandwidth" has a broad concept that refers to the capacity of communication resources for data transmission, the capacity being determined depending on the modulation method or signal configuration of optical communication.

Usually, a node can transmit and receive data with the same bandwidth, and thus the maximum outgoing bandwidth $B_{out}$ is also regarded as the maximum reception bandwidth. During the allotted time slot T, this maximum outgoing bandwidth $B_{out}$ can be assigned in its entirety to a particular reception node. However, in order that a certain source node can address the same reception node again, the certain source node needs to wait until a single reception cycle has elapsed. After a sufficiently long observation time, an effective BW that is a real bandwidth between two nodes is decreased to $B_{out}/d$. In general, as the number of node groups "d" in a network is increased, the effective BW between any paired nodes is decreased accordingly. A new method to increase the value of this effective BW will be described later.

Introduction of a slight time-domain limit to the above data transmission from source nodes to the same reception node can significantly decrease the number of receivers included in the node in the optical network of the present disclosure in FIG. 5, compared to the node of the conventional technique in FIG. 4.

Referring back to FIG. 5, details of the reception node 13 are illustrated on the lower side, and are now described in comparison with the configuration of the reception node of the conventional technique illustrated in FIG. 4. The node 13 in the optical network of the present disclosure additionally includes arrayed waveguide gratings (AWGs) 14 in the front portion of the node to receive an input optical signal of the received data. Each of the AWGs 14 multiplexes optical signals with different wavelengths (from "d" different groups). Each of the AWGs 14 includes input ports whose number is at least equal to the number of groups "d," such that the node 13 can receive data simultaneously from N nodes. The node 13 includes, in its front portion, AWGs whose number is equal to the number of nodes "m" in a single group. The received data multiplexed via "m" AWGs 14 is supplied to the interface unit 15 identical to that of the conventional technique, and then input to the receivers 16. The number of the receivers 16 in the interface unit 15 is significantly decreased by 1/m compared to the configuration of the conventional technique in FIG. 4.

Figure 6A:
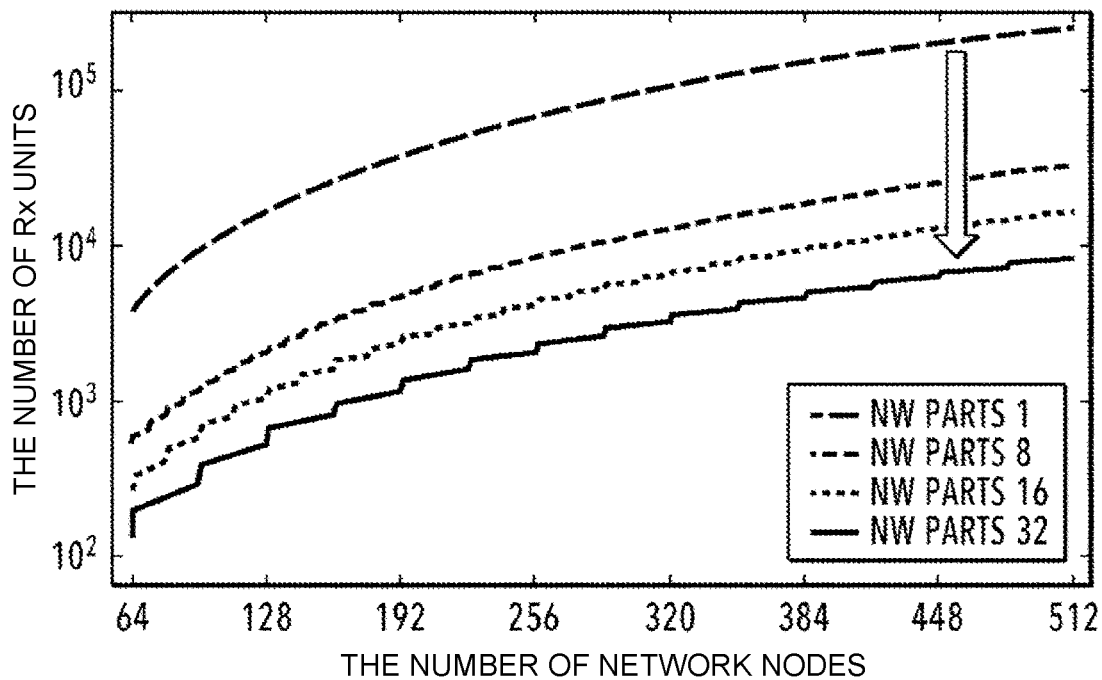
FIG. 6 illustrate the effect of a reduction in the number of receivers obtained by the optical network of the present disclosure.
Figure 6B:
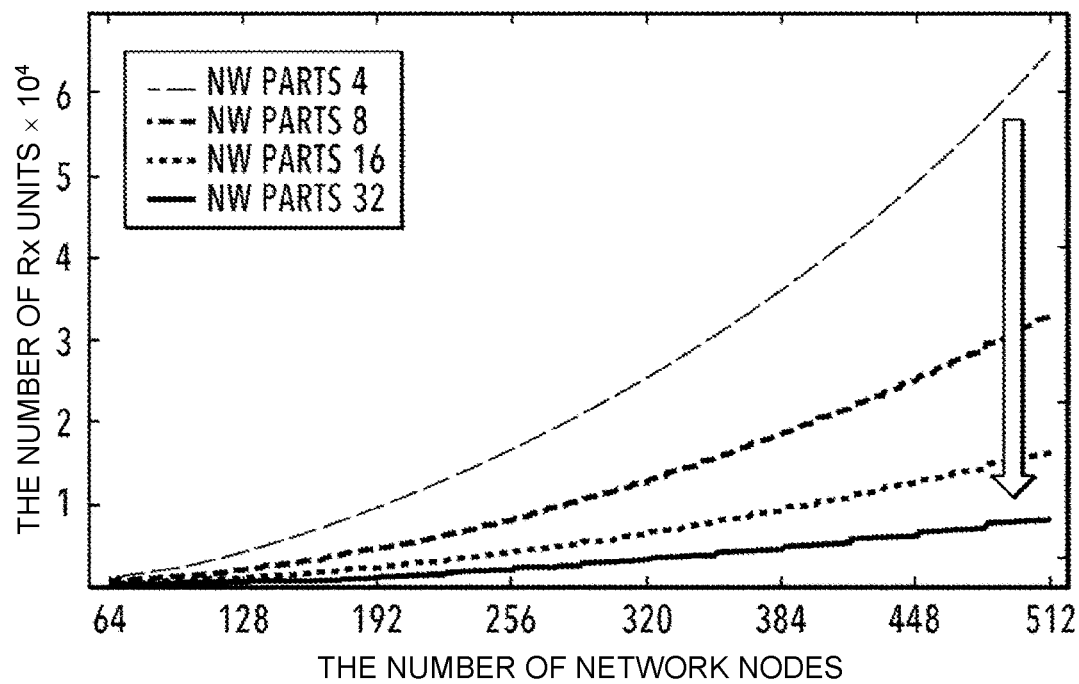

FIG. 6 illustrate the effect of a reduction in the number of receivers obtained by dividing the nodes in the optical network of the present disclosure into groups. FIG. 6 illustrate the relationship between the number of receivers (Rx units) per node and the total number of nodes by using the division number, that is, the number of groups as a parameter. FIG. 6(a) illustrates the number of receivers on the vertical axis in a log scale, while FIG. 6(b) illustrates the number of receivers on the vertical axis normally in a linear scale. Regardless of the number of nodes, as the division number is increased, the number of receivers required can be significantly decreased.

Therefore, the optical network of the present disclosure includes the optical core portion 2 having a full mesh network configuration, and a plurality of nodes connected to the optical core portion, the plurality of nodes being divided into a plurality of groups, each of the groups including at most "m" nodes, wherein only during a time slot associated with a group to which the source node 11 belongs, each of the plurality of nodes 13 can be addressed by any node in the group to which the source node belongs. Each of the plurality of nodes includes "m" arrayed waveguide gratings (AWGs) 14 in which a plurality of input ports of the AWGs receive corresponding optical signals from the at most "m" nodes belonging to the same group, and a wavelength to be used by one or more source nodes of the at most "m" nodes is set to be compatible with the operating wavelength of the plurality of input ports, "m" receivers 16 connected to output multiplexing ports of the AWGs, and an ASIC switch 17 that switches an electrical signal from the "m" receivers, and routes the electrical signal to a plurality of servers 18.

The present disclosure has been described above as the invention of an optical network. However, it should be noted that the present disclosure also has an aspect of the invention as a network node. For example, the aspect of the invention is directed to a node connected to an optical core portion having a full mesh network configuration, wherein the node along with other plural nodes connected to the core portion are divided into a plurality of groups, each of the groups including at most "m" nodes, and only during a time slot associated with a group to which a source node belongs, each of the at most "m" nodes can be addressed by any node in the group to which the source node belongs.

Referring back to FIG. 5, the interface unit 15 in the reception node 13 includes the reception ASIC switch 17 identically to the configuration of the conventional technique. However, the switching capacity of the reception ASIC switch 17 is significantly decreased compared to that of the conventional technique. The configuration of the interface unit in the reception node is significantly simplified in terms of the number of receivers and the capacity of the reception ASIC switch, compared to those of the conventional technique. Further details about operation of the reception node and a reduction in the bandwidth of the reception ASIC switch are described below.

B. Simplification of Reception Switching

When the maximum outgoing bandwidth $B_{out}$ of a single node described above, and the number of nodes "m" in a single group are used, then the node of the present disclosure in FIG. 5 receives data during any time slot with the maximum BW represented as $m \times B_{out}$. This maximum BW is decreased approximately by 1/d, compared to the BW with which the node receives data in completely asynchronous operation (for example, OPS) without using a time slot. As illustrated in FIG. 5, data input to the reception node needs to be switched to a desired ToR switch 18. The reception ASIC switch 17 is used for this switching.

Figure 7A:
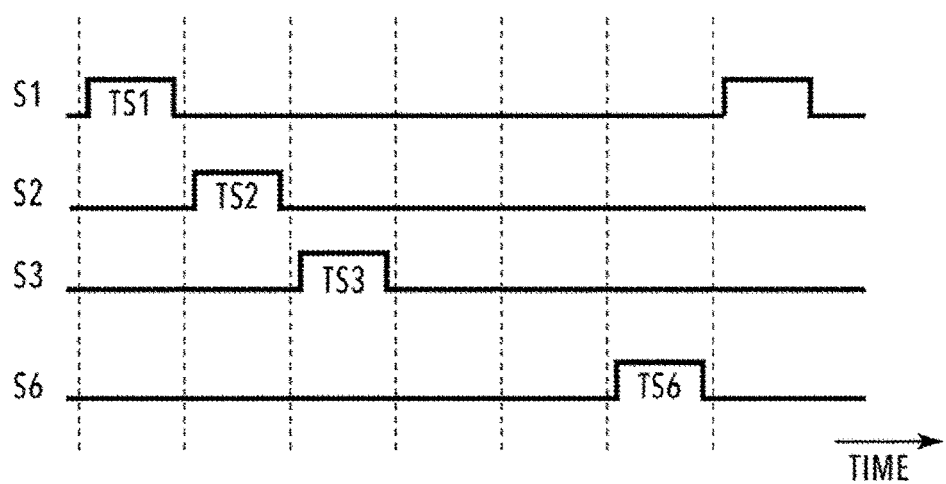
FIG. 7 are explanatory diagrams illustrating data receiving operation of the reception node in the optical network.
Figure 7B:
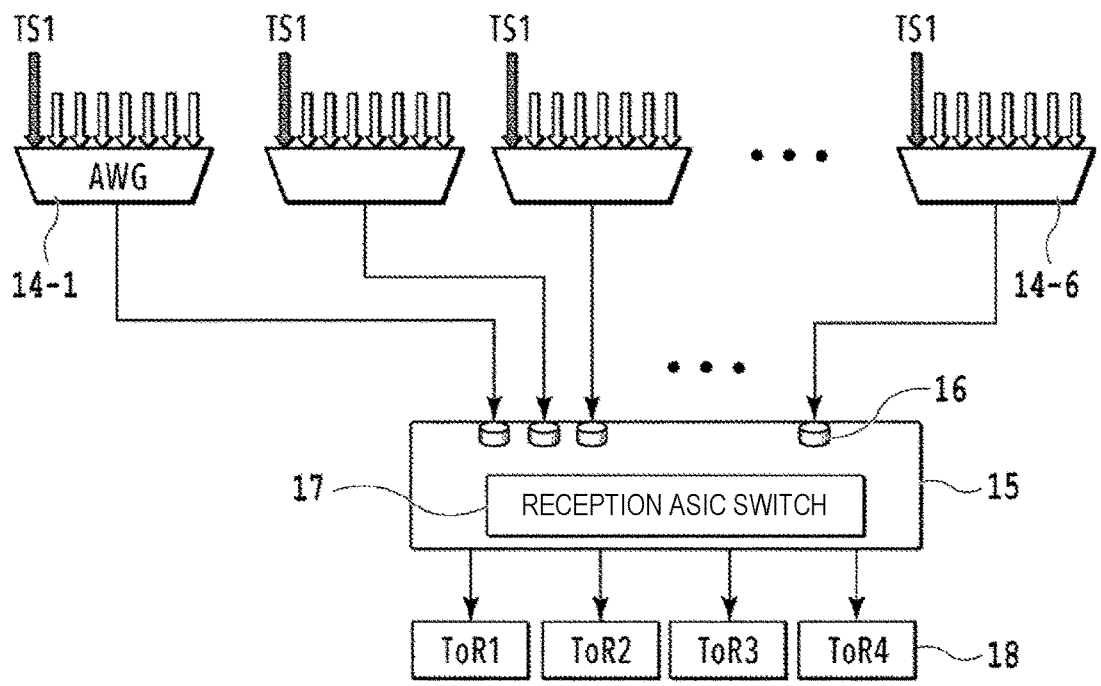

FIG. 7 are explanatory diagrams illustrating data receiving operation of the reception node in the optical network of the present disclosure. FIG. 7(a) illustrates the time slot configuration. FIG. 7(b) is an explanatory diagram illustrating switching operation when data is received during TS1. The ASIC switch 17 in the interface unit 15 in FIG. 7(b) includes "m" ports on the input side facing the network, and also includes ports on the other output side, whose number is equal to the number of the ToR switches 18. In a case where a plurality of links are used for each ToR switch, there are ports present whose number corresponds to the number of the plurality of links.

FIG. 7(a) illustrates an example of the time slot configuration when all the nodes illustrated in FIG. 5 are divided into six groups. "m" nodes belonging to each of the groups receive data only during a time slot corresponding to the group. For example, data from six source nodes belonging to the first group is received by the ports corresponding to the respective AWGs during only TS1 as illustrated in FIG. 7(b). "m" AWGs 14-1 to 14-6, whose number is equal to the number of nodes "m" present in a single group, receive data from "m" different source nodes. Therefore, during a particular time slot, the "m" input ports of the ASIC switch 17 can import data received respectively from different source nodes in the same group. That is, it is possible to receive data simultaneously from all the "m" source nodes in the same group.

As illustrated in FIG. 7(b), for the sake of simplifying the switching process in different groups, the AWGs are connected to the respective ports on the input side of the ASIC switch 17, while the nodes in the same group are connected respectively to the different AWGs. Nodes in a permitted group can only be active during the allotted time slot, while the remaining nodes in the other groups do not transmit data to a destination node at all.

For exemplification purposes, all the nodes in the active group (for example, G1) during TS1 are assumed to use the same wavelength λ1. Input signals with a wavelength λ1 are passively routed toward the ASIC switch 17 by a plurality of AWGs ("m" AWGs). That is, the input signals with the wavelength λ1 are routed by connecting different nodes in the same group to the respective ports of the "m" AWGs having the corresponding wavelength. During the next TS2, all the nodes in the next active group (G2) are assumed to transmit a signal with a wavelength λ2. At this time also, input signals with the wavelength λ2 from the nodes belonging to G2 are passively routed toward the ASIC switch 17 by the plurality of AWGs ("m" AWGs).

In general, it is not necessary for nodes in the same group to transmit signals with the same wavelength. It suffices that a plurality of wavelengths to be used by nodes in different groups connected to the same AWG are adjusted to different wavelengths such that there is no wavelength conflict. When all the nodes in the same group use the same wavelength as described above, then the AWGs in the reception node can use the common configuration.

FIG. 8 illustrate examples of reception switching operation in a network of a further different group configuration. FIG. 8 illustrate examples of reception in a case where the total number of nodes "N" is equal to 512, the number of groups (the division number) "d" is equal to 16, and the number of nodes "m" in a group is equal to 32. FIG. 8(*a*) illustrates an example of reception from G1 during TS1. FIG. 8(*b*) illustrates an example of reception from G2 during TS2. Further, FIG. 8(*c*) illustrates an example of reception from G16 during TS16. FIGS. 8(*a*) to 8(*c*) show the node Nos. (1 to 512) assigned to inputs to the AWGs. These examples show that 32 nodes in the same group use the same wavelength. However, the 32 nodes may use different wavelengths for individual AWGs. By using 32 AWGs 14-1 to 14-32, a reception node can receive data simultaneously from 32 different nodes belonging to the same group during the same time slot. In this configuration, it suffices that the interface unit of the reception node includes 32 receivers corresponding to the 32 AWGs.

Figure 9:
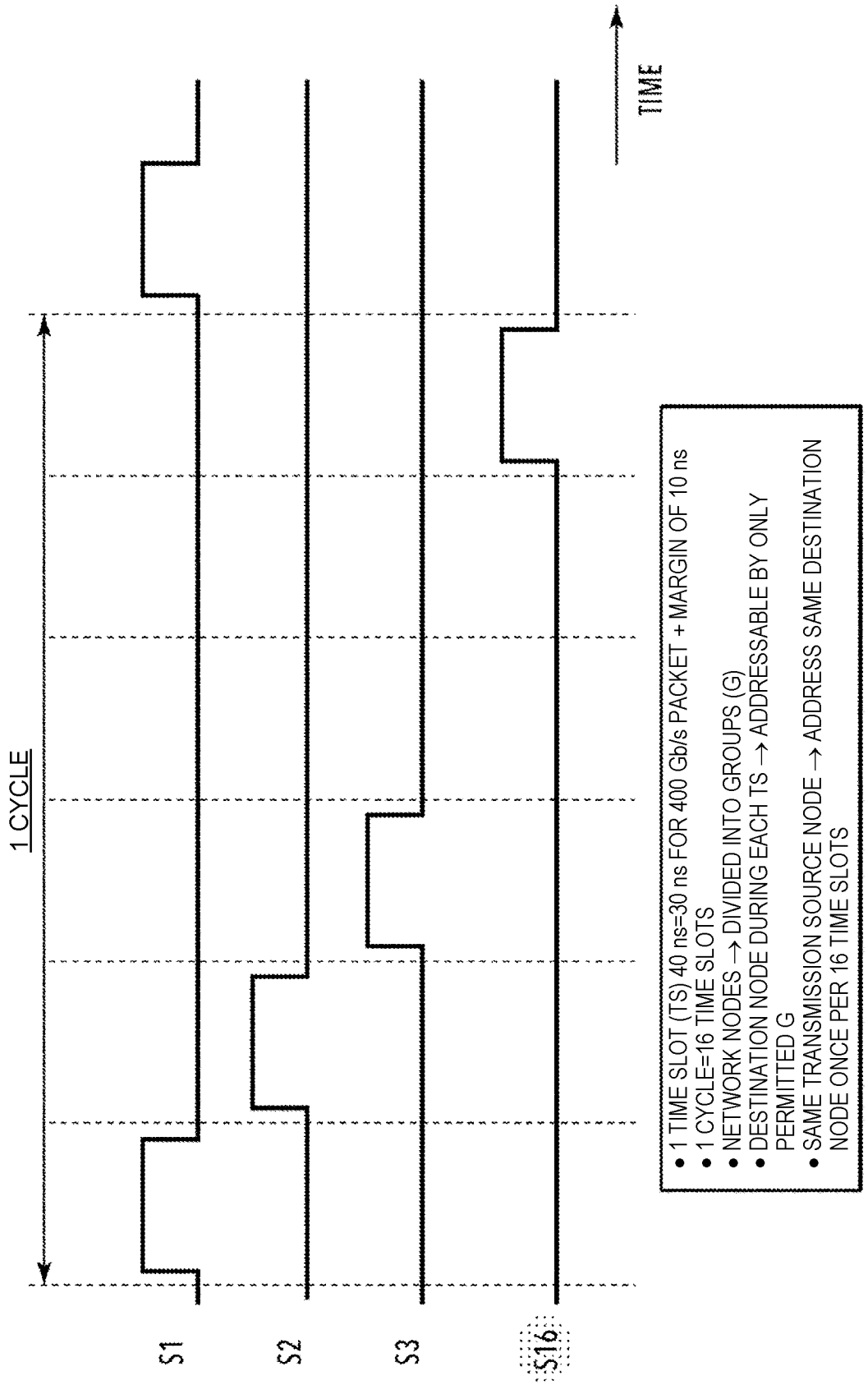
FIG. 9 exemplifies the network and node specifications according to the present disclosure.

FIG. 9 exemplifies the network and node specifications according to the present disclosure. FIG. 9 illustrates an example with parameters made up of 16 groups divided from the network and 16 time slots corresponding to the 16 groups. Specifically, a single time slot has a length of 40 ns obtained by combining 30 ns corresponding to a 400 Gb/s packet with a margin of 10 ns. A single cycle is divided into 16 time slots. 512 network nodes are divided into 16 groups. There are 32 nodes in a single group. During each time slot, a destination (reception) node is addressed only by a permitted group. The same source node can address the same destination node once per 16 time slots.

C. Reduction in BW of Reception ASIC Switch

As mentioned in the descriptions of FIG. 5, the node in the optical network of the present disclosure is of a configuration in which the capacity of the reception ASIC switch is significantly reduced compared to that of the conventional technique. Specifically, the capacity of the reception ASIC switch is set to a value that corresponds with the average volume of incoming traffic or to a value that slightly exceeds the average volume of incoming traffic. The reception ASIC switch is provided with its associated memory to handle a volume of traffic exceeding this switching capacity with a slight delay. Hereinafter, with reference to FIG. 10 and FIG. 11, the node in the flat optical network of the present disclosure is described as practically handling an adequate volume of traffic, even though the capacity of the reception ASIC switch is reduced compared to that of the node of the conventional technique.

The present inventors studied the decrease in the switching load of the ASIC switch in a node by classifying traffic to be input to a reception node, in other words, an input bandwidth BW of the reception node, into two categories with different requirements. The two categories of traffic include (a) traffic that needs real-time switching without any additional delay, and (b) traffic that does not always need real-time switching by the reception ASIC switch since the volume of traffic has already exceeded the processing capability of a server connected to the ASIC switch. The average reception BW is allocated to (a) traffic, while the maximum reception BW is allocated to (b) traffic. Hereinafter, how the switching capacity of the reception ASIC switch, that is, the transmission band of the reception ASIC switch can be allocated into different BWs corresponding to the two categories of traffic is considered.

In a case with the maximum reception BW when real-time processing is not needed, a storage medium (memory) is introduced to partially store therein received data at a reception node. This ensures that the received data is not lost, or does not need to be retransmitted. A major advantage to the introduction of the storage medium is that the switching capacity of the reception ASIC switch can be decreased, while acknowledging the disadvantage of adding a redundant delay.

Figure 10A:
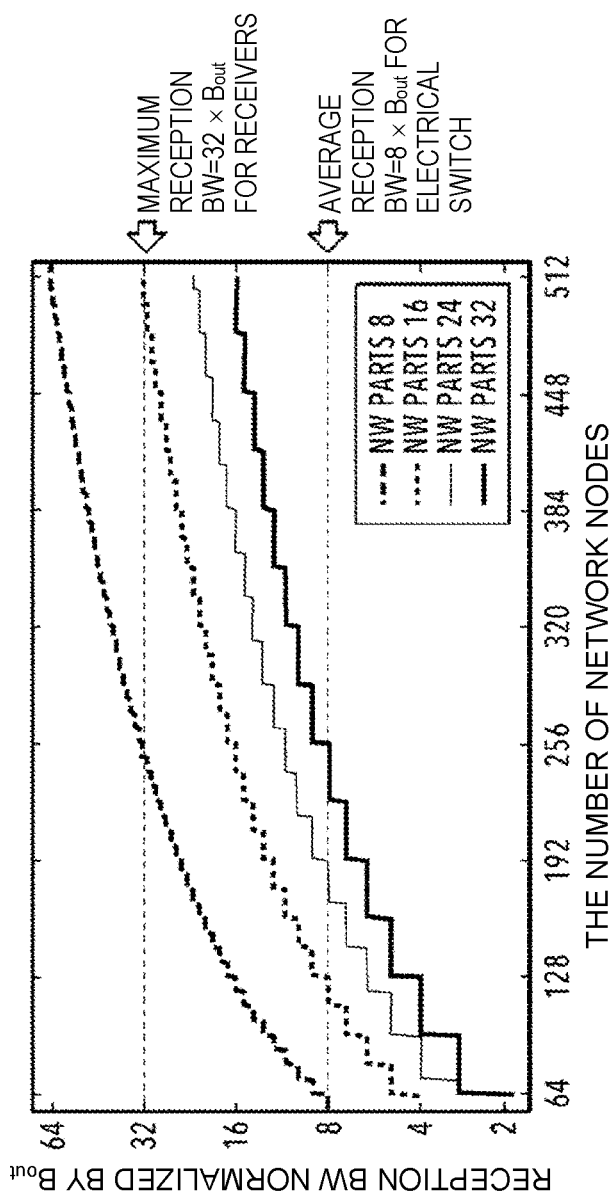
FIG. 10 are explanatory diagrams illustrating the concept that the reception bandwidth needed for the reception node differs.
Figure 10B:
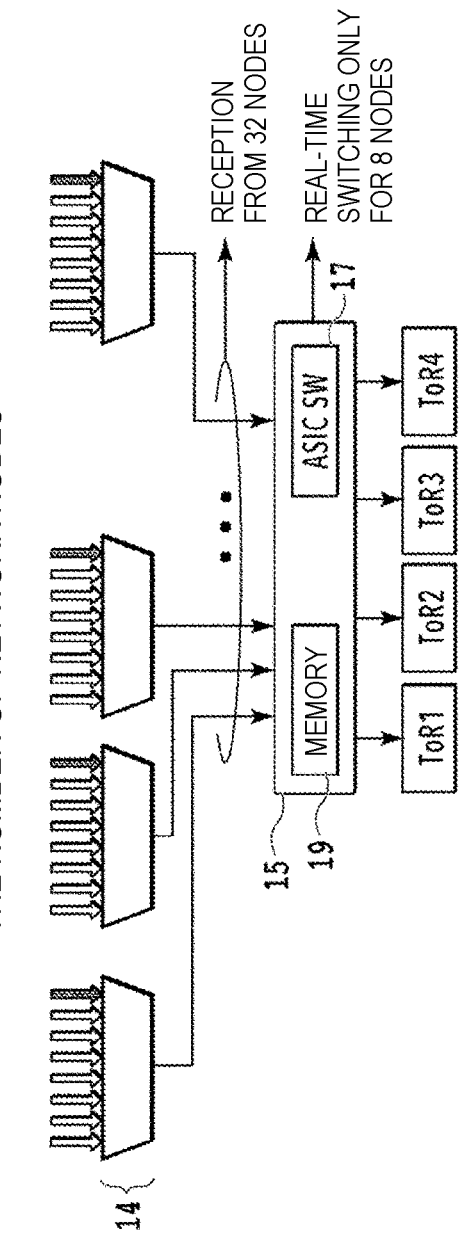

FIG. 10 are explanatory diagrams illustrating the concept that the reception bandwidth needed for the reception node differs. FIG. 10(*a*) illustrates a relationship between the reception BW normalized by the bandwidth $B_{out}$ with which a single node can receive data, and the number of nodes "N" in the network, using the number of groups (the division number in the network) "d" as a parameter (d=8, 16, 24, or 32). The bandwidth $B_{out}$ of the reception node is the same as the maximum outgoing bandwidth of the source node described in FIG. 5. In an example of the network in which 512 nodes are divided into 16 groups, each reception node needs to be provided with 32 (=512/16) receiver units to accommodate the normalized maximum BW that is 32 times wider than the BW that can be generated by the reception node itself. When the normalized average reception BW is assumed to be 8, then the switching capacity of the reception ASIC switch is decreased by 8/32 compared to the maximum switching load. FIG. 10(*b*) is an explanatory diagram illustrating the two reception bandwidths described above. FIG. 10(*b*) shows that 32 receivers are needed in the front portion of the interface unit connecting to outputs of the AWGs to ensure simultaneous reception of all the input data from 32 nodes. On the other hand, FIG. 10(*b*) also shows that the reception ASIC switch in the interface unit is provided with the memory, and thus it suffices that the reception ASIC switch has the average reception BW for eight nodes to perform a real-time switching process for the eight nodes accordingly.

The average reception BW is variable for each individual node. However, the average reception BW can normally be set significantly narrower than the maximum reception BW, except for a limited number of particular nodes. This is due to the natural balance of traffic in the flat optical network 2 that is the base of the DC network of the present disclosure illustrated in FIG. 2. The balance mechanism can be explained as characteristics of the traffic in the flat optical network as follows.

FIG. 11 is an explanatory diagram illustrating an obtainable combination of a plurality of nodes with different average numbers of connections. The characteristics of the traffic, which are the base of the flat optical network, are described below. In a flat optical network with uniform connectivity and 100% traffic load, the average number of incoming connections per node is supposed to be 1. Under these conditions, when a node starts receiving more incoming connections on average, then the average number of incoming connections starts deviating from 1. This means that, in the flat optical network, traffic having been received by a certain node is directed toward another busy node. As more nodes become busy, the average number of connections at the remaining nodes is naturally decreased.

To clarify this idea numerically in FIG. 11, a simulation of the example network with 512 nodes and 100% traffic load was performed. For the purpose of simplifying the calculation without loss of generality, network nodes were classified into three categories. That is, the network nodes were classified into three categories including (a) busy node with the average number of incoming connections "Q" (>1), (b) non-busy node with the average number of incoming connections being 1, and (c) node not having received data. The horizontal axis in FIG. 11 represents the proportion by percentage of non-busy nodes with the traffic in category (b). The vertical axis in FIG. 11 represents the maximum proportion by percentage of busy nodes with the traffic in category (a) described above, and with the average number of incoming connections "Q" being larger than 1. Therefore, the graph in FIG. 11 uses the value of average number of connections "Q" to the busy node in category (a) as a parameter to show the relationship of node proportion between the nodes in category (b) and the nodes in category (a) that satisfy the condition of 100% traffic load.

As illustrated in FIG. 11, as the value of average number of connections "Q" to the busy node increases from 2 to 4, to 6, and then to 8, the maximum proportion of the busy nodes in category (a) with such an average number of connections "Q" as described above significantly decreases. It is understood from the specific point denoted by "A" that the maximum 11% of nodes can still have the average number of connections "Q" being 8 even under the exaggerated conditions that 10% of the nodes are non-busy nodes in category (b) with the number of connections being 1, and 79% of the nodes are in category (c) with the number of connections being 0 due to not receiving data. At this point "A," the network with 100% traffic load has been established in a node distribution state, in which the majority of nodes (79%) do not receive data, while the remaining nodes include the minority (10%) of non-busy nodes (Q=1) and the minority (11%) of nodes under concentrated traffic with the average number of connections "Q" being equal to 8. This example clearly shows, from the viewpoint of the maximum reception switching capacity of the reception ASIC switch, that a reception ASIC switch having such a low capacity as to handle only the average volume of incoming traffic can still be used adequately. The simulation in FIG. 11 shows that in the network in which 512 nodes are divided into 16 groups, provided that the normalized average reception BW corresponding to the average incoming traffic is set to 8, the capacity of the reception ASIC switch is sufficient to handle traffic.

As illustrated in FIG. 10(*b*), the reception node in the optical network of the present disclosure includes a plurality of the AWGs 14 and the interface unit 15 that are configured to passively route received data from different source nodes. The interface unit 15 includes, in the front portion thereof, receivers and the reception ASIC switch 17, and further includes storage means (memory) 19 operating in conjunction with the reception ASIC switch 17. The capacity of the reception ASIC switch 17 is set to correspond with the average volume of incoming traffic, or is set slightly higher than the average volume of incoming traffic, so that the reception ASIC switch 17 can handle a volume of traffic exceeding this switching capacity with a slight delay by using the storage means 19.

D. Time Clocking and Synchronous Mechanism

In the optical network of the present disclosure illustrated in FIG. 5 to FIGS. 8, data transmission between nodes is conducted normally in a burst mode by using time slots, instead of being conducted continuously with time. To receive (incoming) data correctly, a clock signal to be used to generate this data also needs to be present in a reception (destination) node. There are several techniques proposed for executing data clock recovery from input data. For example, a preamble has been known as being necessary for a clock data recovery (CDR) circuit to start receiving a burst signal. Such a data clock recovery technique as descried above affects a reception throughput.

Another approach to data clock recovery is to generate and distribute a master clock signal to all the network nodes. This approach has already demonstrated that data reception and switching can be performed with sub-nanosecond accuracy, even at network nodes located several tens of kilometers away from each other (see Non-Patent Literature 1).

Figure 12A:
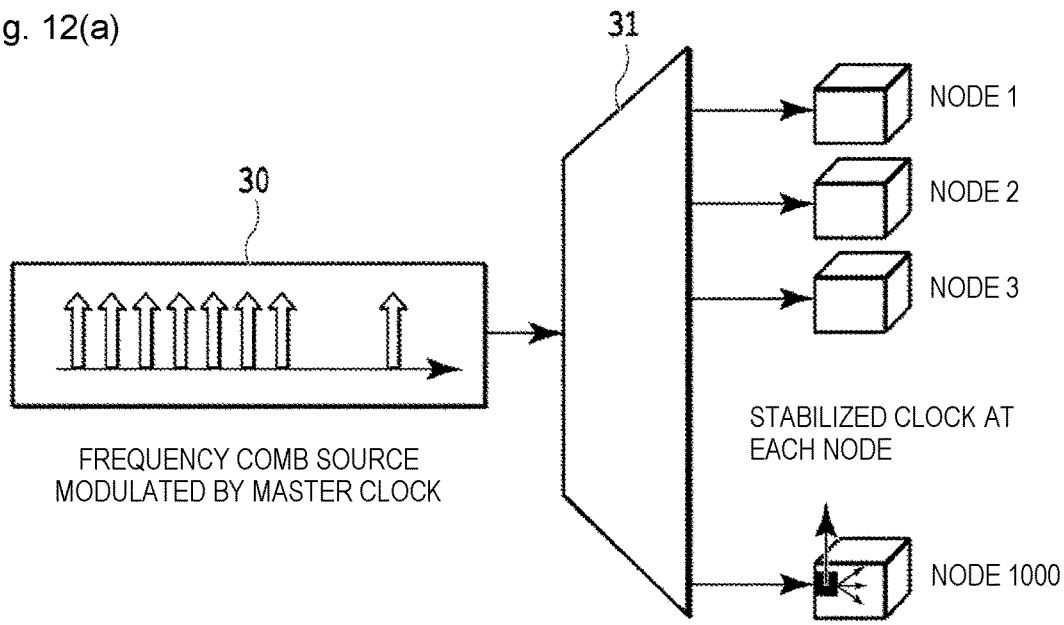
FIG. 12 illustrate the configuration to generate and distribute an optical clock in the network.
Figure 12B:
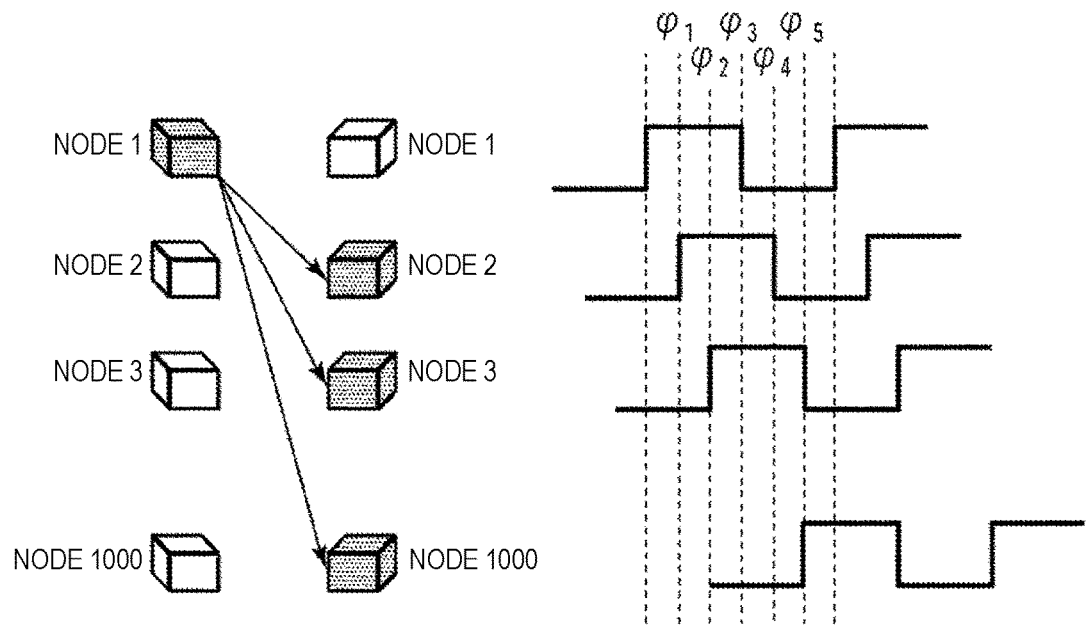

FIG. 12 illustrate the configuration to generate and distribute an optical clock, which can be used in the optical network of the present disclosure. FIG. 12(*a*) illustrates the configuration of the optical clock generation and distribution system that can be used in data center facilities. FIG. 12(*b*) illustrates the clock synchronous operation. As illustrated in FIG. 12(*a*), an output 30 of a frequency comb made up of multiple synchronized wavelengths is modulated by a master clock signal. An AWG 31 is used to spatially separate the modulated output into individual modulated optical signals. The signals separated from each other by the AWG 31 are used to provide a necessary clock source for one or more network nodes (node 1 to node 1000).

As illustrated in FIG. 12(*b*), even during the same time slot, the timings to start transmission to different nodes slightly vary among the nodes. A certain degree of synchronization in the data transmission is needed to allow data incoming to a particular network node to correctly fall within the allotted time slot. When the same clock is shared among all the nodes, in general, there can be some phase mismatch from one node to another node.

The phase caching technique is available to separately correct the phase mismatch between any two nodes without requiring unrealistically large-scale synchronization in the network. Prior to transmitting actual data from a source node to a destination node, first the phase is adjusted between these two nodes to allow the transmitted data to fall within a desired time slot. Thereafter, the value having been used to adjust the phase is saved, that is, cached, so that this value is used each time data is transmitted between these paired nodes. In the actual DC network environment, the phase caching technique has experimentally demonstrated that no additional phase correction is needed for several hours (Non-Patent Literature 2). The phase caching technique requires an optical path between any paired nodes to be deterministic, that is, requires any paired nodes not to have a plurality of paths to be determined probabilistically. The structure of the optical network of the present disclosure described above satisfies this condition.

Therefore, the node in the optical network of the present disclosure can include a phase caching unit that calculates an adjustment value to adjust the phase of the time slot between two nodes and then saves therein the adjustment value prior to data transmission/reception, thereby to allow the reception timing to fall within the associated time slot.

Increase in Effective Bandwidth Between Network Nodes

As described above, since the optical network of the present disclosure imposes a limit on data reception at a reception node, this optical network operates in accordance with the time slot system for data transmission from source nodes to the same destination node. Therefore, a source node needs to wait until a single reception cycle has elapsed, such that the source node can address the same destination node again. The optical network of the present disclosure imposes a limit on data reception. This results in a decrease in the real transmission rate, and thus narrows the effective BW for data transmission between paired nodes.

Figure 13:
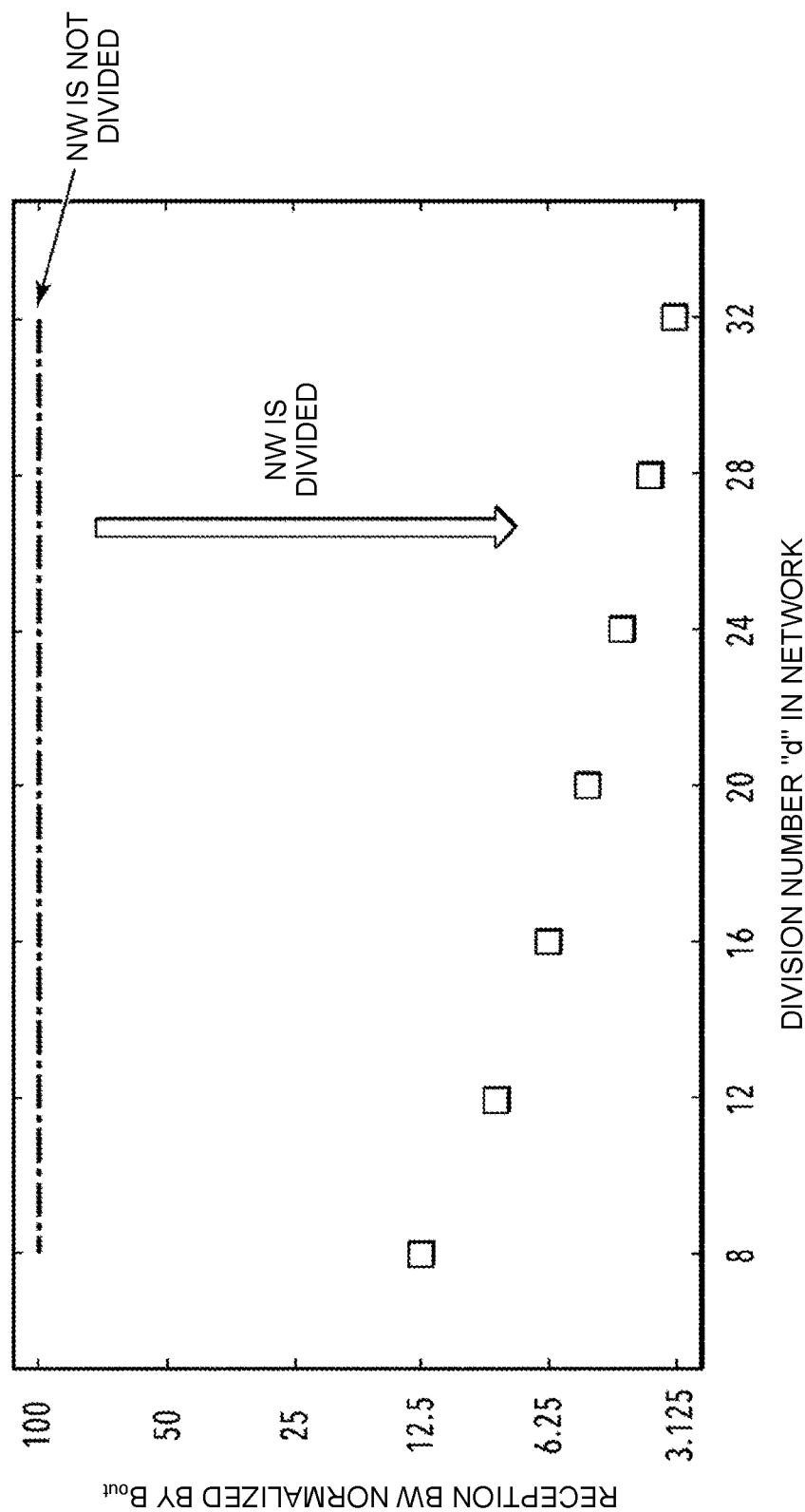
FIG. 13 is an explanatory diagram illustrating narrowing of effective BW between paired nodes due to division of the network.

FIG. 13 is an explanatory diagram illustrating narrowing of the effective BW between any paired nodes due to division of the network. The horizontal axis in FIG. 13 represents the division number (the number of groups) "d" in the network, while the vertical axis in FIG. 13 represents the reception BW normalized by $B_{out}$ that is the maximum outgoing BW at a reception node. As illustrated in FIG. 13, the reception BW decreases with an increase in the division number "d" in the network. For example, as the division number "d" increases from 8 to 32, the reception BW decreases from 12.5% to 3.12%. Thus, there is a need for a mechanism that compensates for this decrease in the effective BW. Two different solutions to the problem of decrease in the effective BW are presented below.

The first solution is to make it possible for data from a source node to arrive at a desired destination node during one or more time slots. For example, as illustrated in FIGS. 8(a) to 8(c), the desired destination node can receive data from a certain source node only during a single time slot allotted to the group to which the certain source node belongs. In contrast to that, the first solution allows the desired destination node to also receive the data during another time slot. It should be noted that the mechanism of the first solution can be carried out by adding a new component to a node on the transmission side, that is, a source node.

FIG. 14 are explanatory diagrams illustrating the basic mechanism for receiving data during a time slot other than the allotted time slot. FIG. 14(a) illustrates basic receiving operation in the optical network of the present disclosure having been described above. In FIG. 14(a), each of the explanatory diagrams for TS1 to TS3 illustrates a source node $N_i$ on the left side, while illustrating on the right side a destination node that can be addressed by the source node $N_i$. A box 41 between two nodes illustrates the conceptual path between the two nodes. As having been described above, during a time slot 1 (TS1), the source node $N_i$ can address only particular nodes shown by the connection arrows, and then the addressable node is changed from $N_j$ to $N_{j+1}$ during the next TS2, and then changed from $N_{j+1}$ to $N_{j+2}$ during the next TS3. Conversely, in view of the data reception direction, three reception nodes $N_j$, $N_{j+1}$, and $N_{j+2}$ receive data during different TSs from each other. It can thus be understood that these three reception nodes belong to different groups from each other.

FIG. 14(b) illustrates the configuration of source nodes to implement the first solution proposed, in which a small-scale additional switching unit 42 is provided to adjust the time slots to be used among a plurality of source nodes. The additional switching unit 42 allows the adjacent source nodes $N_i$ to $N_{i+2}$ belonging to different network groups to address different nodes $N_j$ to $N_{j+2}$ during the time slot TS1.

FIG. 15 is an explanatory diagram illustrating an additional switch for source nodes to compensate for a decrease in the effective BW. FIG. 15 illustrates four groups (G1 to G4) in a network 40, each of which includes six nodes. Three nodes, including a node $N_i$ 43, a node $N_{i+1}$ 44, and a node $N_{i+2}$ 45 belonging to different groups, are now considered. The three nodes 43, 44, and 45 make up a local group 46 that shares different time slots, and need to be located physically adjacent to each other in the data center. These three nodes belong to different groups. The additional switching unit 42 described above can adjust the time slots between these three nodes to be used for data to be transmitted from each of the nodes, in terms of space and time. The small-scale switching unit 42 is additionally provided to coordinate the time slot for data to be transmitted from the node $N_i$ 43, the node $N_{i+1}$ 44, and the node $N_{i+2}$ 45 in the manner as described above, so that the data from all the three source nodes can arrive at the reception nodes $N_j$ to $N_{j+2}$ not only during a dedicated time slot, but also during three different time slots.

Therefore, in the optical network of the present disclosure, among the plurality of nodes, plural source nodes 43, 44, and 45 belonging to the group different from one another include the additional switching unit 42 that adjusts the time slots such that each of the plural source nodes 43, 44, and 45 can use a different time slot from a time slot associated with the corresponding source node. Due to this configuration, each of the source nodes 43, 44, and 45 uses both the time slot associated and the different time slot to transmit data to a reception node.

The local group 46 of source nodes in FIG. 15 shares time slots between the source nodes belonging to three different groups. However, the number of groups is not limited thereto, but the local group 46 may share the time slots between two groups, or between four or more groups. The number of groups sharing the time slots is not particularly limited unless the configuration of, and the control by, the additional switching unit 42 become too complicated. Although the time slots can be shared only between a plurality of source nodes adjacent to each other and belonging to different groups, when two time slots can be used, then this can simply double the effective BW illustrated in FIG. 13. The additional switching unit 42 is provided among different source nodes, which just means that a transmission ASIC switch is partially shared between the different source nodes. That is, a case is examined in more detail, where in accordance with an approach equivalent to providing the additional switching unit 42 described above, between two adjacent source nodes, an extra switching capacity of one of the nodes is added to the other node.

Figure 16A:
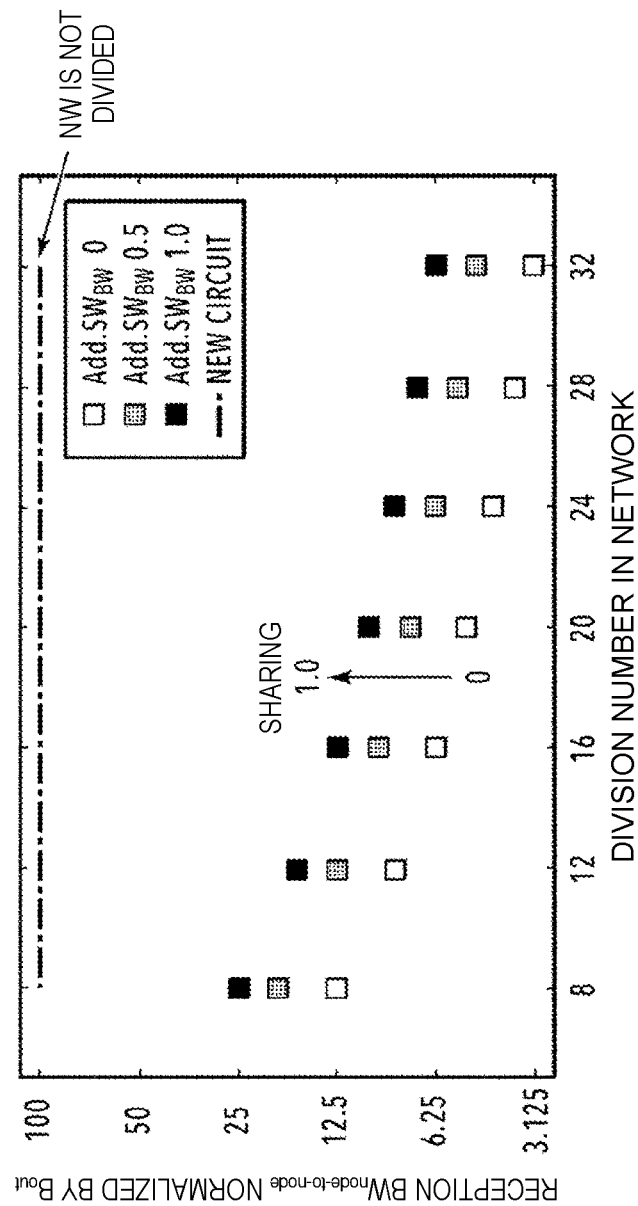
FIG. 16 are explanatory diagrams illustrating sharing of a transmission bandwidth between two source nodes.
Figure 16B:
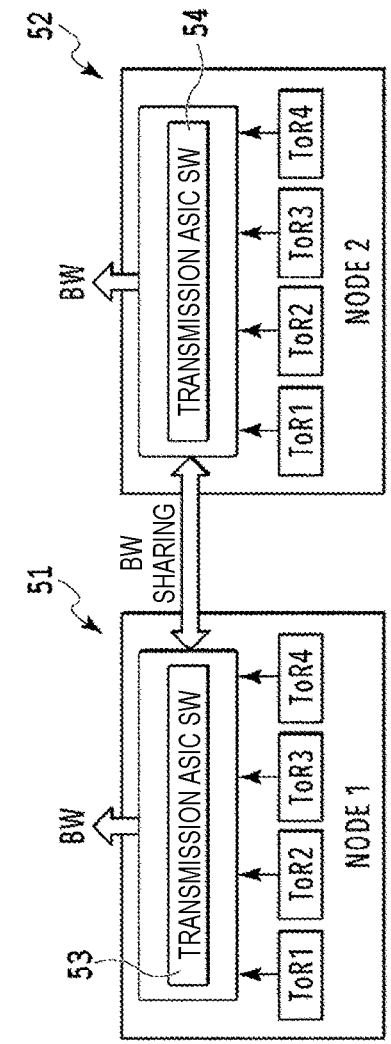

FIG. 16 are explanatory diagrams illustrating sharing of a transmission BW between two source nodes. As will be described later, FIG. 16(a) is an explanatory diagram illustrating the effect of improvement in the node-to-node effective BW due to sharing the transmission ASIC switch between the nodes. FIG. 16(b) is a conceptual diagram illustrating BW sharing between the transmission ASIC switches of the source nodes. In the conventional technique with independent nodes not sharing the BW, when data is transmitted from a source node, the source node uses the transmission ASIC switch to handle traffic from a ToR connected only to the target node. This transmission ASIC switch is referred to as "transmitter switch." As illustrated in FIG. 16(b), between two source nodes 51 and 52, extra switches of a transmission ASIC switch 53 in one source node 51 can be shared with a transmission ASIC switch 54 in the other node 52. This switching resources sharing is shown by a bidirectional arrow labeled "BW sharing."

FIG. 16(a) uses the proportion of sharing of the transmission ASIC switch between two source nodes as a parameter to represent the division number (the number of groups) in the network on the horizontal axis, while representing the transmission BW ($BW_{Node\ to\ Node}$) normalized by $B_{out}$ that is the maximum outgoing BW on the vertical axis. The effective transmission BW can be improved by varying the sharing level from 0 to 1.0. The perfect sharing can double the effective transmission BW. The first solution of sharing the BW between the transmission ASIC switches, including sharing the time slots by using the additional switching unit described above, needs to increase the switching capacity of an ASIC chip, and involves increased power consumption accordingly. Countermeasures against this increase in the power consumption will be described later.

The second solution to the decrease in the effective BW is to set an optical circuit between any paired nodes to increase the effective BW. As described below, in the second solution, setting of the optical circuit does not involve execution of concentrated control on any portion, and nodes can directly exchange a signaling message serving as a control signal between them through the optical network.

Figure 17:
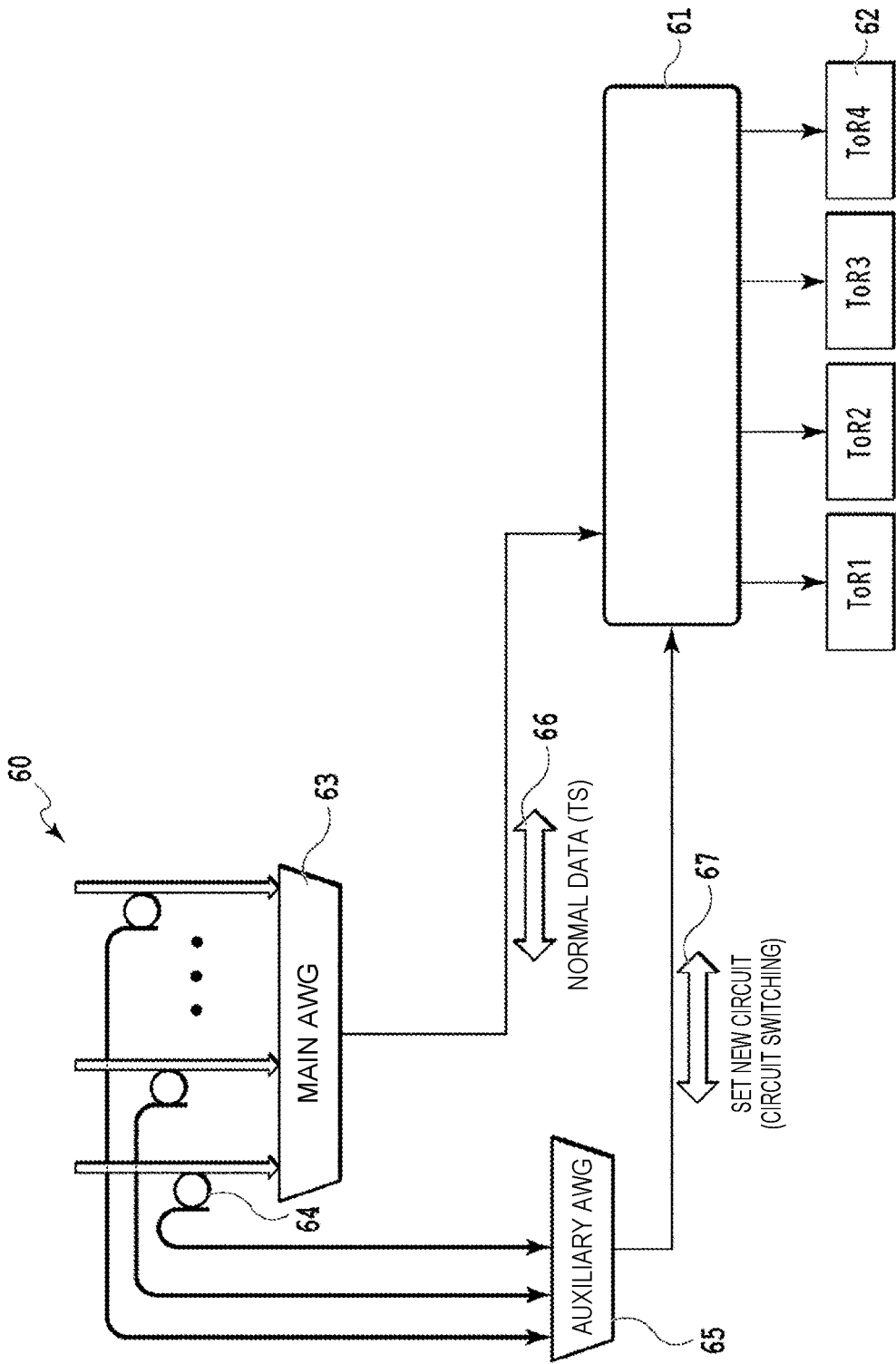
FIG. 17 is an explanatory diagram illustrating a traffic handling method through a circuit in parallel with using a TS.

FIG. 17 is an explanatory diagram illustrating the mechanism for handling traffic through the set circuit in parallel with time-slot transmission without interrupting the time-slot transmission. A reception node 60 in FIG. 17 is of a configuration of the reception node in the optical network of the present disclosure illustrated in FIG. 5. FIG. 17 only illustrates a path along a single AWG 63. In the source node 60 in FIG. 17, there are a plurality of AWGs (not illustrated) directed from the source-node side toward an interface unit 61 including receivers and a reception ASIC switch. The number of the AWGs is "m" that is equal to the number of nodes belonging to a single node group. Each of the AWGs is provided with components designed for circuit setting in parallel with transmission by the main AWG 63, which is described below.

The reception node 60 in FIG. 17 has the basic configuration identical to the reception node illustrated in FIGS. 5, 7, 10, and the like, and includes a main AWG 63, the interface unit 61, and a plurality of ToRs 62. The reception node 60 to improve the effective BW between paired nodes includes optical coupling means 64 on each of the optical transmission paths through which traffic is input to the main AWG 63. The optical coupling means 64 bypasses traffic from the optical transmission path to an auxiliary AWG 65. The optical coupling means 64 can be an optical resonator structure, however, the optical coupling means 64 is not limited to this structure. Examples of the optical coupling means 64 to be used include a ring optical resonator and a 1×2 optical switch. The optical coupling means 64 is turned on when the circuit designed to bypass traffic from the main AWG 63 to the auxiliary AWG 65 is set.

The reception node 60 in FIG. 17 receives data only during the period of allotted time slot via the main AWG 63, as having been described above, and in addition to that, receives additional data through the circuit set according to the circuit switching via the auxiliary AWG 65 during the period of unassigned time slot. Data transmission from the main AWG 63 to the interface unit 61 is denoted by normal data 66. Data transmission through a new circuit according to circuit switching is denoted by circuit-switching data 67.

In the reception node 60 in FIG. 17, data transmission through the new circuit according to circuit switching is performed during a time other than the time slot allotted to the source node. For example, it is assumed that the main AWG 63 is permitted to receive data at its first input port from a source node during the time slot 1. In this case, via the corresponding input port of the auxiliary AWG 65, the circuit-switching data 67 can be received from the same source node during the period of another time slot except the time slot 1. The configuration of the reception node 60 in FIG. 17 prevents interference of data from a certain source node that is already running on the set circuit, and makes it possible to receive the normal data 66 from other source nodes during their respective allotted time slots. A flexible optical network configuration can be achieved by the mechanism in which data transmission limited to a particular time slot allotted is performed in parallel with data transmission according to circuit switching. A usage application of each wavelength can be determined for the wavelength resources used in the optical network. In addition, depending on the state of traffic jam in the network, a circuit for data reception according to circuit switching can be set.

Therefore, the optical network of the present disclosure includes the optical coupling means 64 for optically coupling a portion of the optical signal from the optical transmission path connecting to the input port of each of the "m" AWGs 63, and the auxiliary AWG 65 including a plurality of input ports that receive an optical signal 67 according to the corresponding optical circuit switching from the at most "m" nodes belonging to the same group through the optical coupling means, wherein during the period except the time slot associated with each of the at most "m" nodes, the optical coupling means is operated to supply the optical signal 65 according to the optical circuit switching to the ASIC switch 61.

Figure 18A:
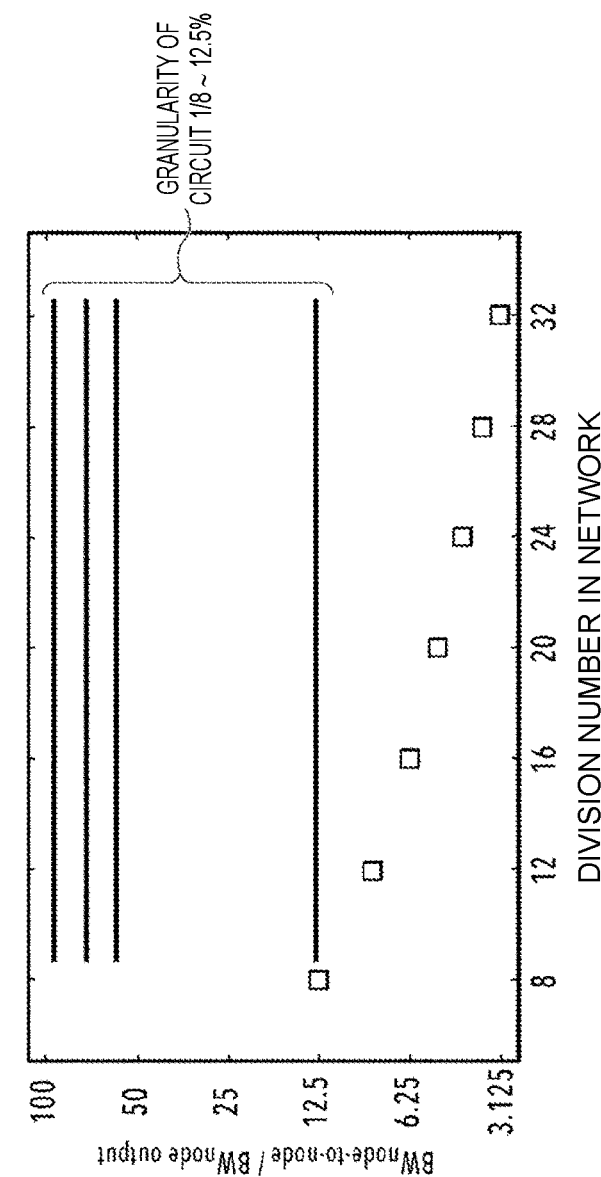
FIG. 18 are explanatory diagrams illustrating improvement in effective BW due to data transmission according to circuit switching.

FIG. 18 are explanatory diagrams illustrating the node configuration and improvement in the effective BW in a case where data transmission according to circuit switching is additionally performed. FIG. 18(a) illustrates the division number in the network and improvement in the effective BW between paired nodes by using the number of circuits to be added as a parameter. As described with reference to FIG. 17, a single link connecting to paired nodes is assumed to be made up of several wavelength channels. For example, in a case where eight wavelengths can be used for a circuit according to circuit switching, the granularity of the circuit can be adjusted by adding more wavelength channels. As illustrated in FIG. 18(a), another destination node can be addressed by using the remaining unreserved wavelength channels for setting an optical circuit. In a case where eight wavelengths can be used, the number of wavelengths to be used in the reception node configuration in FIG. 17 is increased one by one, and accordingly the effective BW of the circuit can be adjusted by the granularity of ⅛, that is, 12.5%. Relative improvement in the effective BW is also illustrated in FIG. 18(a) by using different granularity levels of optical circuits.

Figure 18B:
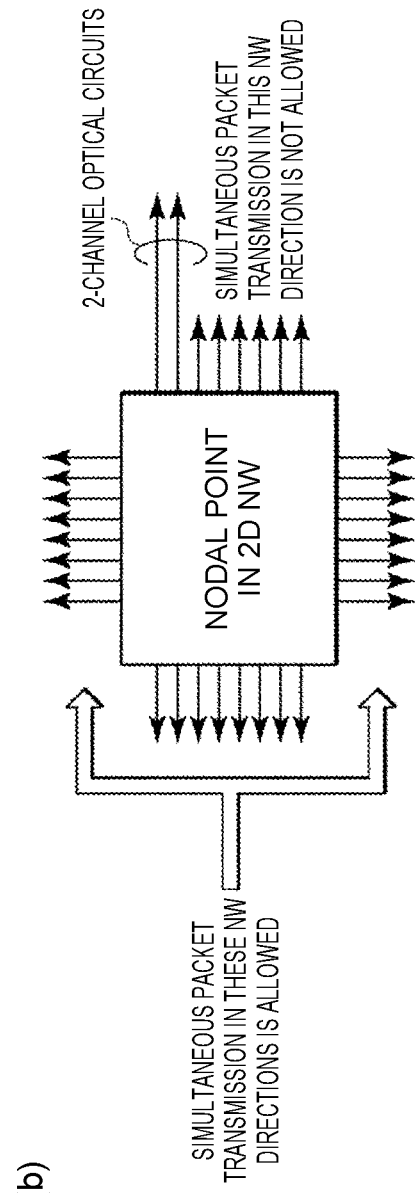

FIG. 18(b) shows that traffic can be transmitted by various transmission methods at a single nodal point of the two-dimensional network. For example, in FIG. 18(b), on the transmission paths directed leftward in the diagram from the single nodal point to the network, simultaneously transmittable packets (OPS) are allowed to be transmitted. In contrast, on the transmission paths directed rightward in the diagram, packets are prohibited from being transmitted simultaneously similarly to the optical network of the present disclosure, while being allowed to be transmitted only during a particular time slot allotted. Further, on some of the transmission paths (links) directed rightward in the diagram, circuits according to the circuit switching as illustrated in FIG. 17 are set to make it possible to transmit the packets during a time period other than the allotted time slot. As illustrated in FIG. 18(b), the optical network and the node configuration of the present disclosure allow for flexible data transmission.

Reduction in Power Consumption in ASIC Switch

The natural balance of traffic reception in the flat optical network has been discussed above. Subsequently, it is discussed below that power consumption in individual ASIC switches is adjusted adaptively, and thereby power consumption in the network in its entirety can also be reduced. Since the average BW for data input to a reception node is varied with time, the reception ASIC switch does not always need to operate with the same switching capacity. It is necessary to adjust the capacity of the ASIC switch on an as-needed basis to meet the increase/decrease in the general demand. The ASIC switch is configurable such that the ASIC switch can cope with the low-BW state. This makes it possible for the ASIC switch to physically reduce its operational power consumption.

Figure 19A:
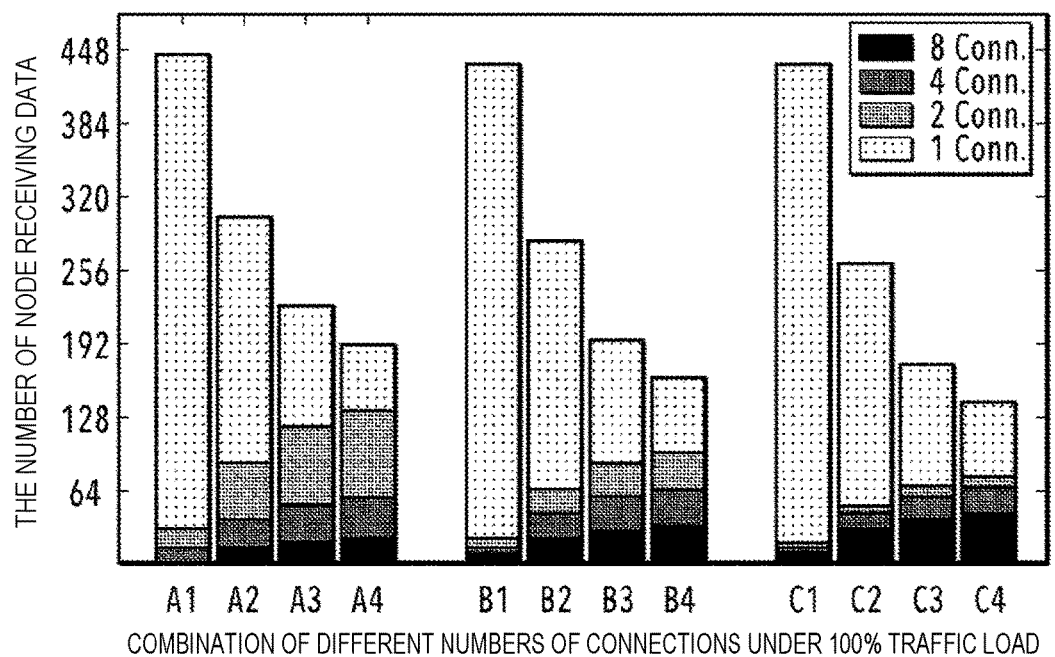
FIG. 19 are explanatory diagrams illustrating examples of switching-power reduction in the network in its entirety.
Figure 19B:
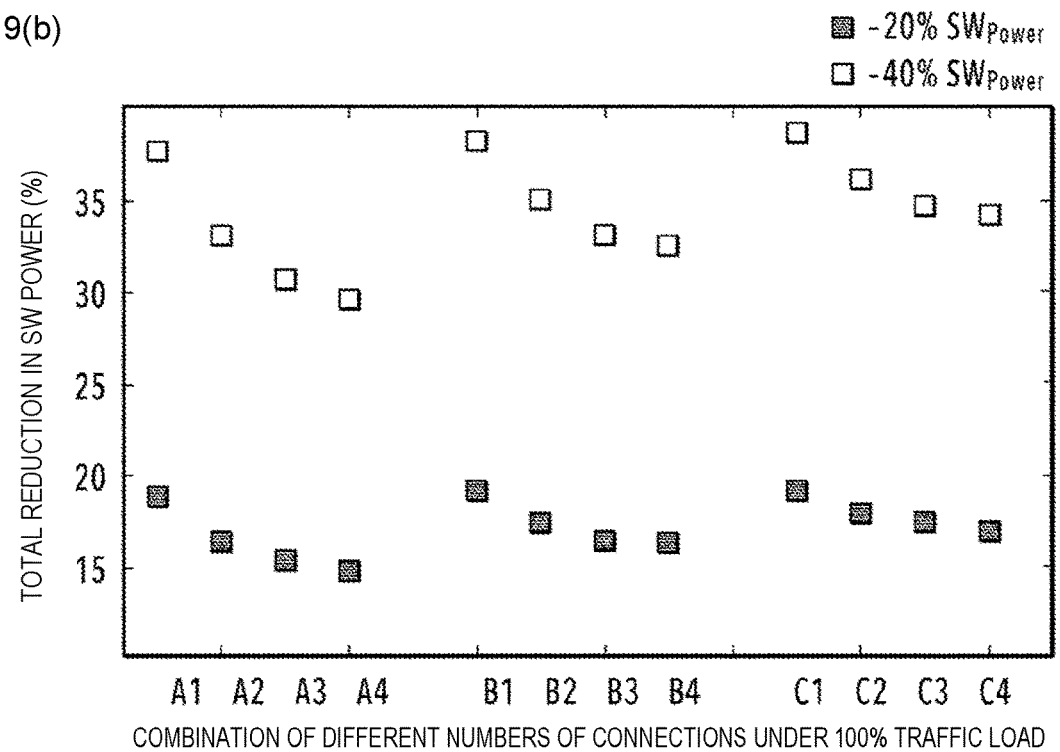

FIG. 19 are explanatory diagrams illustrating examples of switching-power reduction in the network in its entirety. FIG. 19(a) illustrates a distribution of the number of nodes in the combination of nodes A1 to A4, the combination of nodes B1 to B4, and the combination of nodes C1 to C4, the nodes having various average numbers of connections. FIG. 19(b) illustrates the amount of reduction in the ASIC-switch power consumption in the network in its entirety to the combinations of the above distributions of the number of nodes.

FIG. 20 illustrates the numbers of connections in the distribution of the nodes in A1 to A4, in B1 to B4, and in C1 to C4 illustrated in FIG. 19, and the conditions for combination of the numbers of connections. On any of the conditions, the network has 100% traffic load in its entirety, and the combination of the average numbers of connections differs. FIG. 20 illustrates the assumed network states in various load distributions. It is understood that in each distribution of the number of nodes in A1 to A4, in B1 to B4, and in C1 to C4, the proportions of busy nodes and non-busy nodes with completely different average numbers of connections are significantly different from each other.

FIG. 19(b) illustrates the amount of reduction in the power consumption in the network in its entirety when the power consumption in each reception ASIC switch of each individual node is set to −20% and −40%. For example, when the power consumption is set to −20%, the amount of reduction by approximately 19% in the network in its entirety can be observed in A1 based on its average numbers of connections and distribution of the number of nodes. It is also possible to reduce the amount of power consumption by approximately 15% in A4 based on its average numbers of connections and distribution of the number of nodes. Despite significant variations in the distribution of busy nodes and non-busy nodes, it is still possible to achieve considerable power saving in the network in its entirety. Therefore, the switching capacity of the reception ASIC switch is changed in real time on demand, so that the ASIC switch can be operated in multiple levels of power saving modes. This can be an optimal method to reduce power consumption in the network in its entirety.

As described above, the optical network of the present disclosure copes with the problems with the reception ASIC switch and the transmission ASIC switch in the node by using separate approaches for these switches. The electrical switch in the interface unit of the node is different from an electrical switch of the conventional technique in that the electrical switch in the interface unit does not operate bidirectionally, but has separate configurations according to the characteristics of data transmission and reception, unlike the electrical switch of the conventional technique that handles all the traffic.

As described above in detail, the optical network of the present disclosure can simplify the configuration of nodes on the periphery of the DC network, and can reduce power consumption. The optical network of the present disclosure solves, or at least reduce, the problems the ASIC switch has had, and can cope with an increase in the scale of optical network and a reduction in power consumption.

INDUSTRIAL APPLICABILITY

The present invention is applicable to optical communication systems in general.

REFERENCE SIGNS LIST 1, 10, 40, 100 DC network
2 Flat optical network
3, 101, 103 Switch
4, 18, 62, 105, 145 ToR
5, 106 Server
11, 43 to 45, 51, 52 Source node
13, 60, 141 Reception node
14, 14-1 to 14-32, 31, 63, 65 AWG
15, 61, 144 Interface unit
16 Receiver
17 Reception ASIC switch
19 Memory
30 Frequency comb source
42 Switching unit
53, 54 Transmission ASIC switch
64 Optical coupling means
102, 104, 107, 108 Optical link

The invention claimed is:
1. An optical network comprising:
an optical core portion having a full mesh network configuration; and
a plurality of nodes connected to the optical core portion, the plurality of nodes being divided into a plurality of groups, each of the groups including at most "m" nodes,
wherein only during a time slot associated with a group to which a source node belongs, each of the plurality of nodes can be addressed by any node in the group to which the source node belongs,
wherein each of the plurality of nodes includes
"m" arrayed waveguide gratings (AWGs) in which a plurality of input ports of the AWGs receive corresponding optical signals from the at most "m" nodes belonging to a same group, and a wavelength to be used by one or more source nodes of the at most "m" nodes is set to be compatible with an operating wavelength of the plurality of input ports,
"m" receivers connected to output multiplexing ports of the AWGs, and an ASIC switch that switches an electrical signal from the "m" receivers, and routes the electrical signal to a plurality of servers, wherein the ASIC switch has a switching capacity corresponding to an average volume of incoming traffic at the plurality of nodes, and wherein the ASIC switch is provided with a storage medium that stores therein and handle a volume of traffic exceeding the switching capacity.

2. The optical network according to claim 1, further comprising synchronization means for supplying each of the plurality of nodes with a synchronous signal obtained by distributing an optical comb modulated by a master clock.

3. The optical network according to claim 2, wherein a source node and a reception node of the plurality of nodes calculate an adjustment value to adjust a phase of the time slot and save therein the adjustment value prior to data transmission/reception, thereby to allow a reception timing to fall within the associated time slot.

4. The optical network according to claim 1, wherein the ASIC switch has a switching capacity that is configurable in real time on demand.

5. The optical network according to claim 1, wherein the optical core portion is a physical full mesh network, or is a physical full mesh-like network that does not involve electrical-optical-electrical conversion.

6. An optical network comprising:

an optical core portion having a full mesh network configuration; and a plurality of nodes connected to the optical core portion, the plurality of nodes being divided into a plurality of groups, each of the groups including at most "m" nodes, wherein only during a time slot associated with a group to which a source node belongs, each of the plurality of nodes can be addressed by any node in the group to which the source node belongs, wherein each of the plurality of nodes includes "m" arrayed waveguide gratings (AWGs) in which a plurality of input ports of the AWGs receive corresponding optical signals from the at most "m" nodes belonging to a same group, and a wavelength to be used by one or more source nodes of the at most "m" nodes is set to be compatible with an operating wavelength of the plurality of input ports, "m" receivers connected to output multiplexing ports of the AWGs, and an ASIC switch that switches an electrical signal from the "m" receivers, and routes the electrical signal to a plurality of servers, and wherein among the plurality of nodes, plural source nodes belonging to the group different from one another include an additional switching unit that adjusts time slots such that each of the plural source nodes can use a different time slot from a time slot associated with the corresponding source node, and each of the plural source nodes uses both the time slot associated and the different time slot to transmit data to a reception node.

7. An optical network comprising:

an optical core portion having a full mesh network configuration; and a plurality of nodes connected to the optical core portion, the plurality of nodes being divided into a plurality of groups, each of the groups including at most "m" nodes, wherein only during a time slot associated with a group to which a source node belongs, each of the plurality of nodes can be addressed by any node in the group to which the source node belongs, wherein each of the plurality of nodes includes "m" arrayed waveguide gratings (AWGs) in which a plurality of input ports of the AWGs receive corresponding optical signals from the at most "m" nodes belonging to a same group, and a wavelength to be used by one or more source nodes of the at most "m" nodes is set to be compatible with an operating wavelength of the plurality of input ports, "m" receivers connected to output multiplexing ports of the AWGs, and an ASIC switch that switches an electrical signal from the "m" receivers, and routes the electrical signal to a plurality of servers, optical coupling means for optically coupling a portion of an optical signal from an optical transmission path connecting to each of the input ports of the "m" AWGs; and an auxiliary AWG including a plurality of input ports that receive an optical signal according to corresponding optical circuit switching from the at most "m" nodes belonging to the same group through the optical coupling means, wherein during a period except a time slot associated with each of the at most "m" nodes, the optical coupling means is operated to supply the optical signal according to the optical circuit switching to the ASIC switch.

* * * * *